US012483661B2

(12) United States Patent
Nogawa

(10) Patent No.: US 12,483,661 B2
(45) Date of Patent: Nov. 25, 2025

(54) CONTROL PROGRAM, INFORMATION PROCESSING APPARATUS, AND INFORMATION PROCESSING METHOD

(71) Applicant: KONICA MINOLTA, INC., Tokyo (JP)

(72) Inventor: Tetsuren Nogawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 523 days.

(21) Appl. No.: 17/975,913

(22) Filed: Oct. 28, 2022

(65) Prior Publication Data
US 2023/0136409 A1 May 4, 2023

(30) Foreign Application Priority Data
Nov. 2, 2021 (JP) ................... 2021-179264

(51) Int. Cl.
*H04N 1/00* (2006.01)
*G06F 3/12* (2006.01)

(52) U.S. Cl.
CPC ....... *H04N 1/00087* (2013.01); *G06F 3/1208* (2013.01); *G06F 3/1258* (2013.01); *H04N 1/00015* (2013.01); *H04N 1/00039* (2013.01)

(58) Field of Classification Search
USPC ...... 358/1.13, 1.1, 1.15; 346/107.3; 709/247
See application file for complete search history.

(56) References Cited

U.S. PATENT DOCUMENTS

| | | | | |
|---|---|---|---|---|
| 7,546,056 B2* | 6/2009 | Konno | ............... | G03G 15/5087 399/82 |
| 11,057,411 B2* | 7/2021 | Nakata | ..................... | G06F 21/55 |
| 12,153,838 B2* | 11/2024 | Yokoyama | ............ | G06F 3/1234 |
| 2006/0133844 A1* | 6/2006 | Konno | ........................ | B41J 3/60 399/82 |
| 2015/0371126 A1* | 12/2015 | Ota | ....................... | G06K 15/408 358/1.14 |
| 2019/0182283 A1* | 6/2019 | Nakata | ................ | H04L 63/1425 |
| 2023/0136409 A1* | 5/2023 | Nogawa | ................ | G06F 3/1258 358/1.13 |

FOREIGN PATENT DOCUMENTS

| | | | | |
|---|---|---|---|---|
| CN | 114598780 B | * | 8/2024 | ......... H04N 1/00129 |
| JP | 2006256235 A | * | 9/2006 | |
| JP | 2017076194 A | * | 4/2017 | |
| JP | 2018082349 A | * | 5/2018 | ......... H04N 1/00848 |

\* cited by examiner

*Primary Examiner* — Marcus T Riley
(74) *Attorney, Agent, or Firm* — Buchanan Ingersoll & Rooney PC

(57) ABSTRACT

A control program for improving productivity of an apparatus such as an image forming device is stored in a non-transitory computer readable storage medium, wherein the control program causes a computer of an information processing apparatus to function as an analyzer analyzing operation log data of an apparatus and as an analysis result output controller outputting the analysis result acquired by the analyzer, and wherein the analyzer obtains first result information when first setting information is set, which information is setting information before change, and second result information when second setting information is set, which information is setting information after the change.

16 Claims, 16 Drawing Sheets

ANALYSIS RESULT: November/08 (SUN) – November/14 (SAT)

| IMPL. CONF. | PROPOSAL | PROPOSAL TYPE | ANALYSIS TYPE | EXPECTED EFFECT | PROPOSAL SUMMARY ~1011 |
|---|---|---|---|---|---|
| ✓ | | | | 161 min/week | [Week 45] Reference of operation on November/7 may reduce adjusting time per one time to about half when refreshing photoreceptor. |
| ☐ | | | | - | [Week 45] Machine B/W2 received service/maintenance 3 times on Nov/5 and 20 times on Nov/7. Recommend to review maintenance plan. |
| ☐ | | | | - | [Week 45] [IMPROVED] Interruption time reduced, particularly interruption due to full of paper discharge tray reduced by 5.7 hour from 43 week (Oct/18 - Oct/24) on which proposal was presented. |
| ☐ | | | | - | [OPERATION RESULT (weeks 43 - 45)] Analysis of operation result of Oct/18 to Nov/07 found out change in trend of print time by day of week and PV performance by time zone. Recommend review of matching with feeling in field person. |

~1020

ANALYSIS RESULT: October/25 (SUN) – October/31 (SAT)

| IMPL. CONF. | PROPOSAL | PROPOSAL TYPE | ANALYSIS TYPE | EXPECTED EFFECT | PROPOSAL SUMMARY ~1021 |
|---|---|---|---|---|---|
| ☐ | | | | - | [Week 44] A case occurred 7 times in which Machine B/W1 needs interruption time due to full of paper discharge tray more than 5 minutes |
| ☐ | | | | - | [Week 44] [IMPROVED] Machine B/W1 needed less time than long stop time (about 30 minutes) from out-of-paper to print restart in lunch time-zone. |

~1030

ANALYSIS RESULT: October/18 (SUN) – October/24 (SAT)

| IMPL. CONF. | PROPOSAL | PROPOSAL TYPE | ANALYSIS TYPE | EXPECTED EFFECT | PROPOSAL SUMMARY ~1031 |
|---|---|---|---|---|---|
| ✓ | | | | 170 min/week | [Week 43] Machine B/W1 may be reduced interruption time by 170 minutes/week by improving print restart time after occurrence of full of paper discharge tray. |
| ✓ | | | | 30 min/week | [Week 43] Machine B/W1 may be reduced interruption time by 30 minutes/week by improving print restart time after occurrence of out-of-paper. |
| ☐ | | | | - | [OPERATION RESULT (weeks 37 - 43)] Recommend confirming operation result and analysis result and review of matching with feeling in field person. |

FIG. 11

| | | |
|---|---|---|
| 1101 | 💡 | :PROPOSAL/REPORT OF IMPROVEMENT ACTION |
| 1102 | 🔍 | :PROPOSAL/REPORT OF ANALYSIS AND DISCOVERY |
| 1103 | 👤 | :PROPOSAL/REPORT OF OPERATION |
| 1104 | 🖨 | :PROPOSAL/REPORT OF MACHINE |
| 1105 | 📦 | :PROPOSAL/REPORT OF MATERIAL |
| 1106 | 🔄 | :PROPOSAL/REPORT OF METHOD OR PROCESS |
| 1107 | ⏳ | :PROPOSAL/REPORT OF PRINT INTERRUPTION TIME |
| 1108 | ⏱ | :PROPOSAL/REPORT OF OPERATING TIME |
| 1109 | 📄 | :PROPOSAL/REPORT OF PRINT PREPARATION TIME |

FIG. 12

| SETTING ITEM | | RESULT ITEM |
|---|---|---|
| PAPER SETTING | | |
| - SETTING OF AUTOMATIC SWITCHING OF PAPER FEED TRAY | | Corresponding setting of panel: ON/OFF |
| | | Paper detection in paper feed tray |
| | | Processed job list |
| - PAPER-RELATED SETTING SUCH AS PAPER PROFILE SETTING | | Calculation of remedy introduction rate |
| | | Error frequency |
| | | Interruption time due to error |
| SETTING OF AUTOMATIC QUALITY OPTIMIZATION FUNCTION | | |
| - AUTOMATIC FRONT/BACK ADJUSTMENT | | Automatic front/back adjustment setting of panel: ON/OFF |
| | | Frequency of manual adjustment |
| | | Frequency of automatic front/back adjustment |
| | | Adjustment time of front/back adjustment |
| | | Sample print count |
| | | Number of quality defective sheets due to front/back adjustment error |
| - AUTOMATIC ADJUSTMENT OF MAXIMUM DENSITY AND DENSITY BALANCE | | Automatic adjustment setting of panel: ON/OFF |
| | | Frequency of manual adjustment |
| | | Frequency of automatic adjustment |
| | | Adjustment time |
| | | Frequency of sample print |
| | | Frequency of image quality stabilization |
| | | Output sheet number for color adjustment and measurement chart |
| | | Number of quality defective sheets due to color unevenness and streak |
| | | Number of maintenance due to uneven color and streak |
| | | Machine stop time due to uneven color and streak |
| | | Number of reprint due to uneven color and streak |
| | | And reprint time due to uneven color and streak |

910

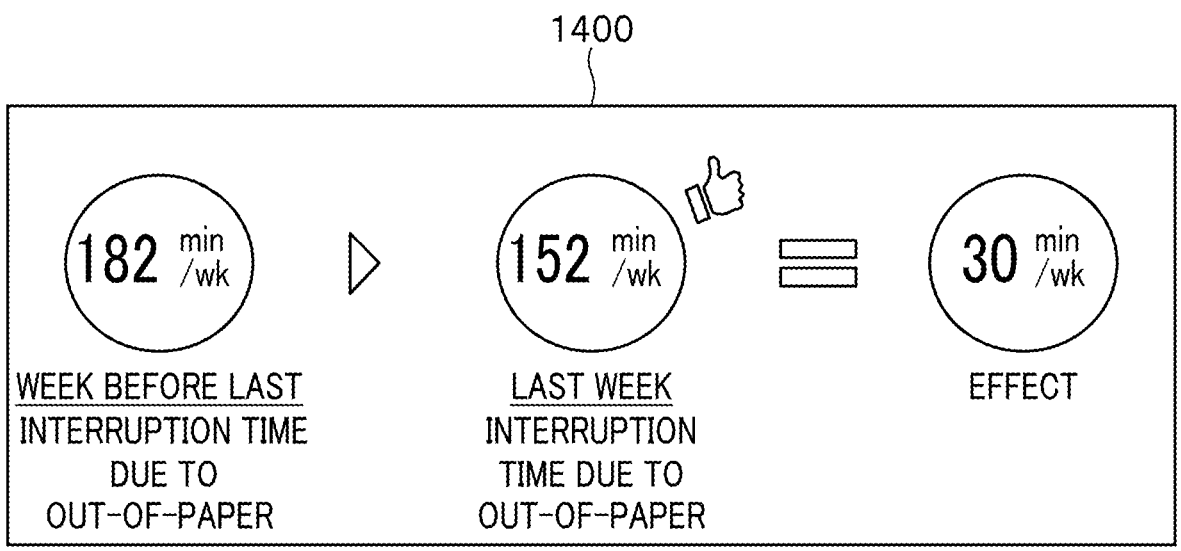
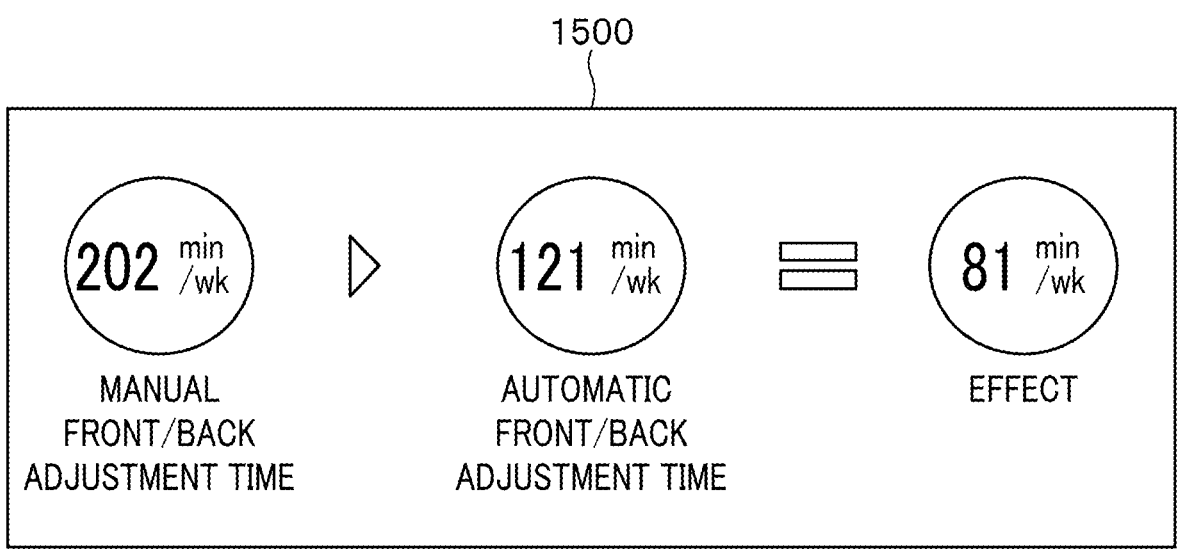

CONTROL PROGRAM, INFORMATION PROCESSING APPARATUS, AND INFORMATION PROCESSING METHOD

CROSS REFERENCE TO RELATED APPLICATION

The present invention relates to and asserts priority from Japanese patent application No. 2021-179264 filed on Nov. 2, 2021, and incorporates entirety of contents and subject matter of the above application herein by reference.

BACKGROUND

Technical Field

The present invention relates to a control program, an information processing apparatus, and an information processing method.

Description of the Related Art

In recent years, technology development for improving productivity (such as the number of prints per predetermined period) of an image forming apparatus has been actively performed. For example, there is a well known technique for specifying a factor causing a decrease in productivity from operation log data of an image forming apparatus to propose a specific improvement measure for improving productivity to a productivity management manager.

Japanese patent application laid-open publication No. JP2006-256235 (hereinbelow, Patent Literature 1) discloses an image forming apparatus which preferentially displays initial setting items whose setting is frequently changed to improve convenience. Further, according to the image forming apparatus of Patent Literature 1, an energy efficiency can be improved on a chance of changing the setting by shifting to an energy saving mode after changing the initial setting item.

SUMMARY

Technical Problem

However, conventionally, there has been no means for confirming whether or not proposed improvement measures have been implemented on a spot, whether or not implementation of the improvement measures has actually been effective, and how effective they have been. As a result, there is a problem that the productivity management manager is not able to have motivation to execute the improvement measures, the improvement measures is not able to be continued, and the productivity using an apparatus such as the image forming apparatus is not able to be improved. Even in the technique of Patent Literature 1, there is a problem that the effect of changing the setting is not able to be confirmed, the setting change is not able to be continued, and the energy efficiency is not able to be improved.

In view of the above technical background, it is an object of the present invention to improve productivity using an apparatus.

Solution to Problem

To achieve the abovementioned object, the following solutions are provided according to several aspects of the present invention.

(1) A non-transitory computer readable storage medium storing a control program causing a computer to function as an analyzer analyzing operation log data of an apparatus and an output controller outputting an analysis result acquired by the analyzer, wherein the analyzer acquires first result information when first setting information is set, which information is setting information of the apparatus before change, and second result information when second setting information is set, which information is setting information of the apparatus after the change.

(2) The non-transitory computer readable storage medium according to (1), wherein the change from the first setting information to the second setting information is a change regarding a settings of automatic switching of a paper feed tray of the apparatus.

(3) The non-transitory computer readable storage medium according to (1), wherein the change from the first setting information to the second setting information is a change regarding an automatic quality optimization function.

(4) The non-transitory computer readable storage medium according to (1), wherein the change from the first setting information to the second setting information is a change due to maintenance of the apparatus.

(5) The non-transitory computer readable storage medium according to (1), wherein the change from the first setting information to the second setting information is a change complying a manual for operating the apparatus.

(6) The non-transitory computer readable storage medium according to any one of (1) to (5), wherein the analyzer acquires difference information between the first result information and the second result information.

(7) The non-transitory computer readable storage medium according to any one of (1) to (6), wherein the control program causes the analyzer to obtain an introduction rate of the apparatus which introduction rate indicates a rate of the apparatuses to which the change from the first setting information to the second setting information is introduced.

(8) The non-transitory computer readable storage medium according to (7), wherein the control program causes the analyzer to obtain difference information when the introduction rate is changed from a first introduction rate to a second introduction rate.

(9) The non-transitory computer readable storage medium according to (6), wherein the control program causes the analyzer to predict difference information when the setting information is changed to a third setting information.

(10) The non-transitory computer readable storage medium according to any one of (1) to (8), wherein the control program causes the computer to function as a designator that designates a first period during which the first result information is acquired and a second period during which the second result information is acquired.

(11) The non-transitory computer readable storage medium according to (6), wherein the control program causes the output controller to output a priority depending on a degree of an effect indicated by the difference information.

(12) The non-transitory computer readable storage medium according to any one of (1) to (10), wherein the control program causes the output controller to output an option indicating a change in the setting information.

(13) The non-transitory computer readable storage medium according to (12), wherein the control program causes the designator according to (10) to designate one or more of the options outputted.

(14) The non-transitory computer readable storage medium according to (6), wherein the control program causes the output controller to output the difference information resulting from a last change of the setting information.

(15) The non-transitory computer readable storage medium according to any one of (1) to (14), wherein the first result information and the second result information include at least one of a frequency of error occurrences in print jobs, an interruption time of the print jobs due to the error, a number of quality defective sheets of printed matter, and a frequency of reprinting.

(16) An information processing apparatus including an analyzer analyzing operation log data of an apparatus and an output controller outputting an analysis result acquired by the analyzer, wherein the analyzer obtains first result information when first setting information is set, which information is setting information of the apparatus before change; and second result information when second setting information is set, which information is setting information of the apparatus after the change.

(17) An information processing method including: analyzing operation log data of an apparatus and outputting an analysis result acquired by the analyzing, wherein the analyzing obtains first result information when first setting information is set, which information is setting information of the apparatus before change; and second result information when second setting information is set, which information is setting information of the apparatus after the change.

BRIEF DESCRIPTION OF DRAWINGS

The advantages and features provided by one or more embodiments of the invention may be more clearly understood from detailed description given hereinbelow and the appended drawings, which are given by way of illustration only and thus are not intended as a definition of the limits of the present invention.

The drawings are as follows:

FIG. 10 is a diagram showing an example of an analysis result screen of operation log data of the image forming apparatus according to the present embodiment.

FIG. 11 is a diagram showing a legend of graphical symbols displayed on the analysis result screen according to the present embodiment.

FIG. 12 is a diagram showing an example of a data structure diagram of a mapping table.

FIG. 14 is a diagram showing a screen example of a specific example (1) of an improvement action.

FIG. 15 is a diagram showing a screen example of a specific example (2) of the improvement action.

DESCRIPTION OF EMBODIMENTS

Hereinafter, embodiments of the present invention are described in detail with reference to the drawings. Each figure is only schematically shown to the extent that the present invention is able to be fully understood. Therefore, the scope of the invention is not limited to the illustrated examples. Further, in each figure, common components or similar components are denoted by the same reference signs, and duplicate description thereof is omitted. In addition, detailed description of known features not directly related to the present invention may be omitted.

First, a productivity management system for managing a productivity of one or more image forming apparatuses according to the present embodiment is described with reference to FIG. 1.

[Productivity Management System]

Figure 1:
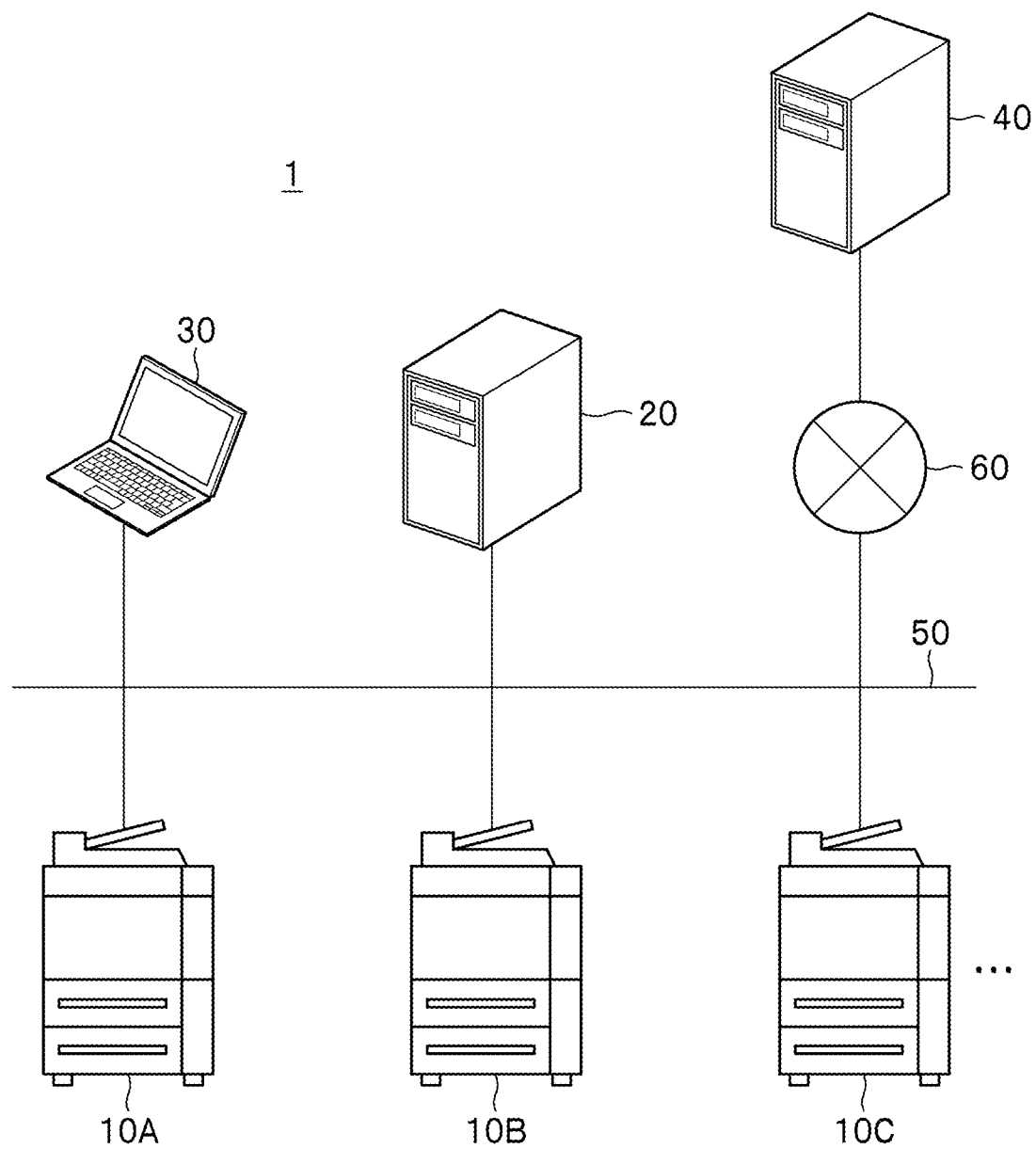
FIG. 1 is a schematic diagram showing an example of a network configuration of a productivity management system according to an embodiment of the present invention.

FIG. 1 is a schematic diagram showing an example of a network configuration of the productivity management system 1.

The productivity management system 1 includes image forming apparatuses 10A, 10B, and 10C, a print server 20, a productivity management terminal 30, and an information processing apparatus 40. The apparatuses are connected so as to be able to communicate with each other.

The image forming apparatuses 10A, 10B, and 10C perform a process of forming an image on a recording material (also referred to as a print process) based on an inputted print instruction. The image forming apparatuses 10A, 10B, and 10C output operation log data to a network 50 according to each of their operation histories. Although three image forming apparatuses 10A, 10B, and 10C are illustrated in FIG. 1, the number of image forming apparatuses may be one or more, or four or more. In the description below, the image forming apparatuses 10A, 10B, and 10C may be referred to as "image forming apparatus 10" when it is unnecessary to distinguish the image forming apparatuses 10A, 10B, and 10C from each other or when common functions thereof are described. It should be noted that the image forming apparatuses 10A, 10B, and 10C may be a multi-functional apparatus having other functions in addition to the print process. The other functions include, for example, a copy function, a scan function, a facsimile function, an automatic quality optimization function, and the like. Examples of the automatic quality optimization function include, but are not limited to, an automatic adjustment function before printing (front/rear position adjustment, output density adjustment, density balance adjustment, gamma adjustment, etc.), a real-time correction function during printing (real-time gradation correction, real-time front/rear position adjustment, etc.), and an in-line automatic inspection function (detection of paper contamination image defect, discharge of defective pages, automatic recovery printing, post-print inspection report creation, etc.).

The print server 20 is connected so as to be able to communicate with each of the image forming apparatuses 10A to 10C. The print server 20 relays communication of the image forming apparatuses 10A to 10C with other devices. For example, the print server 20 receives a print job from a user terminal (not shown) via the network 50 and instructs the image forming apparatuses 10A to 10C to perform printing.

The productivity management terminal 30 displays information on a productivity of the image forming apparatuses 10A to 10C provided from the information processing apparatus 40 via the network 50 and a network 60. For the productivity management terminal 30, a personal computer or a mobile terminal can be used. A productivity management manager checks the information on the productivity displayed on the productivity management terminal 30, and manages the productivity of the image forming apparatuses 10A to 10C and operates them.

The information processing apparatus 40 acquires the operation log data from the image forming apparatuses 10A to 10C via the networks 50 and 60, analyzes the operation log data, and manages the productivity of the image forming apparatuses 10A to 10C based on a result of the analysis. For example, the information processing apparatus 40 manages a plurality of the image forming apparatuses 10 connected to the network 50 for each customer on a basis of a table image that links each of the image forming apparatuses with each customer. The information processing apparatus 40 transmits to the productivity management terminal 30 the results of the analysis of the operation log data (including improvement measures) as information related to the productivity of the image forming apparatuses 10A to 10C. The information processing apparatus 40 may be configured as a Web server. In this case, the productivity management terminal 30 operates as a Web client (Web browser).

The network 50 is a local area network such as a LAN and the network 60 is a wide area network such as the Internet and corresponds to a so-called cloud. The network 50 and the network 60 are communicably connected with each other via a relay device such as a router (not shown). The network 50 and the network 60 may be configured using a single network.

The print controller 200 (FIG. 2) of the image forming apparatus 10 may be configured by applying WebDAV (Web-based Distributed Authoring and Versioning) on it. The WebDAV is a distributed file system having functions of copying and deleting files directly for a Web server and acquiring and setting file information such as a file owner and update date and time, and implemented by a protocol enhanced from HTTP1.1. In addition, in a configuration in which the print server 20 relays communication between the image forming apparatus 10 and the network 50, the WebDAV may be applied on the print server 20.

Alternatively, the productivity management system 1 can be configured such that the network 60 (cloud) is connected to a storage server (not shown) that stores the operation log data output from the image forming apparatus 10, from which storage server the information processing apparatus 40 may acquire the operation log data of the image forming apparatus 10. In this configuration, a message queuing (Web service) may be introduced on the network 60 (cloud), which message queuing allows the storage server and the information processing apparatus 40 to asynchronously transmit and receive data therebetween. Alternatively, middleware for the message queuing may be implemented in the information processing apparatus 40.

Next is description of a hardware configuration of each of devices mainly constituting the productivity management system 1.

[Hardware Configuration of Image Forming Apparatus]

Figure 2:
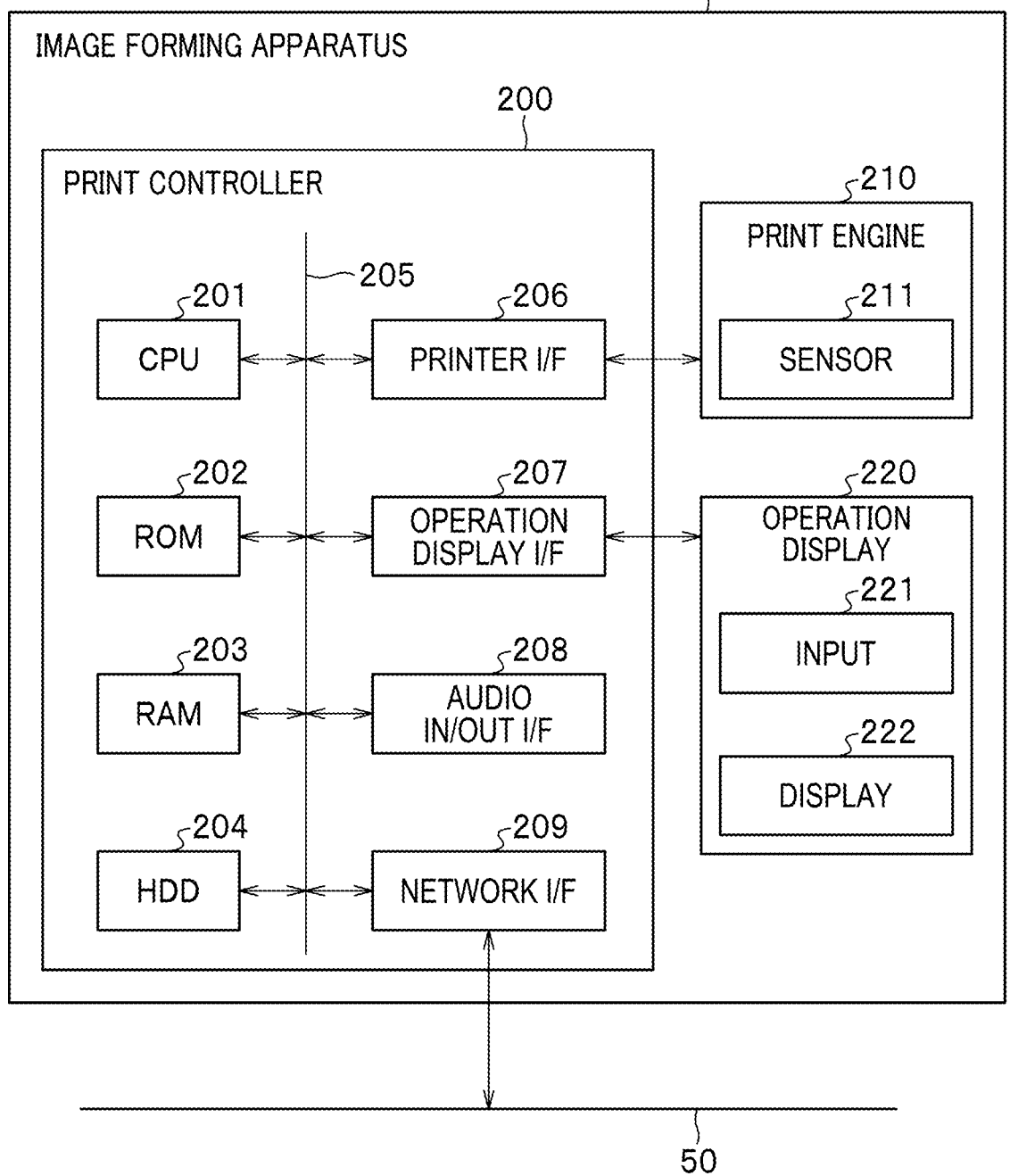
FIG. 2 is a block diagram showing an example of a hardware configuration of a printing machine according to the present embodiment.

FIG. 2 is a block diagram showing an example of a hardware configuration of the image forming apparatus 10.

The image forming apparatus 10 includes a print controller 200, a print engine 210, and an operation display unit 220.

The print controller 200 receives a print original data file from a user terminal (not shown), generates image data, and transfers the image data to the print engine 210. The print controller 200 includes a CPU 201, a ROM 202, a RAM 203, a hard disk (HDD) 204, a printer I/F (interface) 206, an operation display I/F 207, an audio input/output I/F 208, and a network I/F 209. These devices are connected via a system bus 205 with each other.

The CPU 201 integrally controls accesses to various devices connected to the system bus 205 on a basis of a control program stored in the ROM 202 or the HDD 204. The ROM 202 stores a control program that can be executed by the CPU 201. The RAM 203 mainly works as a main memory and a work area of the CPU 201 and the like, and can be expanded in its memory capacity using an optional RAM connected to an expansion port (not shown). The HDD 204 stores a boot program, various application programs, font data, user files, editing files, and the like. Note that although the HDD 204 is used for an external storage device in this embodiment, the external storage device may include a device such as an SD card, a flash memory, or the like in addition to the HDD 204.

The printer I/F 206 controls output of image data to the print engine 210, which is a mechanism performing a print process. Based on the image data inputted, the print engine 210 performs the print process (transfer of color materials such as toner and ink onto a recording material) by an electrophotographic system, an inkjet recording system, or the like. The print engine 210 is provided with a plurality of sensors 211, with which the print engine 210 detects a state of a driving device, an actuator or the like (not shown) in the image forming apparatus 10 to output detection data to the printer I/F 206.

The sensors 211 may be an optical sensor, a temperature sensor, a humidity sensor, a voltmeter, an ammeter, an acceleration sensor, an encoder, an image sensor, or the like. The printer I/F 206 may include an A/D converter that converts an analog signal into a digital signal when the analog signal is input from the sensor 211.

The image forming apparatus 10 is provided with a door open/close detection sensor (not shown) for detecting open/close of a door attached to the image forming apparatus 10, a tray pull-out detection sensor for detecting pull-out/put-in of a paper feed tray, and the like. The print engine 210 does not perform the print process, for example, when the door open/close detection sensor detects a door open or the tray pull-out detection sensor detects a tray pull-out. Sensors that affect the operation of the print engine 210, such as a door open/close detection sensor and a tray pull-out detection sensor, are included in the sensor 211.

The operation display I/F 207 performs a display control of a display 222 provided in the operation display unit 220 and an input control of various setting information set through an input unit 221. The operation display unit 220 includes, for example, a liquid crystal display panel as the display 222 and a touch sensor as the input unit 221. The audio input/output I/F 208 controls audio input/output from/ to an audio input/output device such as a microphone, a speaker, and a headset (not shown).

The network I/F 209 receives image data to be output to the print engine 210 and information (print settings) necessary for a print control from the print server 20 via the network 50.

In a system in which the image forming apparatuses 10 and the print server 20 are connected by a dedicated line, communication of the image forming apparatuses 10 with the network 50 may be performed through the print server 20. Further, in the case of using the dedicated line, the image forming apparatuses 10 and the print server 20 may each include a control system I/F (not shown) for communicating information necessary for the print control and an image data system I/F (not shown) for communicating image data to be printed.

In the image forming apparatus 10, the CPU 201 acquires detection data from the plurality of sensors 211 through the printer I/F 206 and stores the detection data as operation log data in the HDD 204. Further, the CPU 201 transmits the operation log data of the image forming apparatus 10 through the network I/F 209 and the network 50 to the information processing apparatus 40.

[Hardware Configuration of Print Server]

Figure 3:
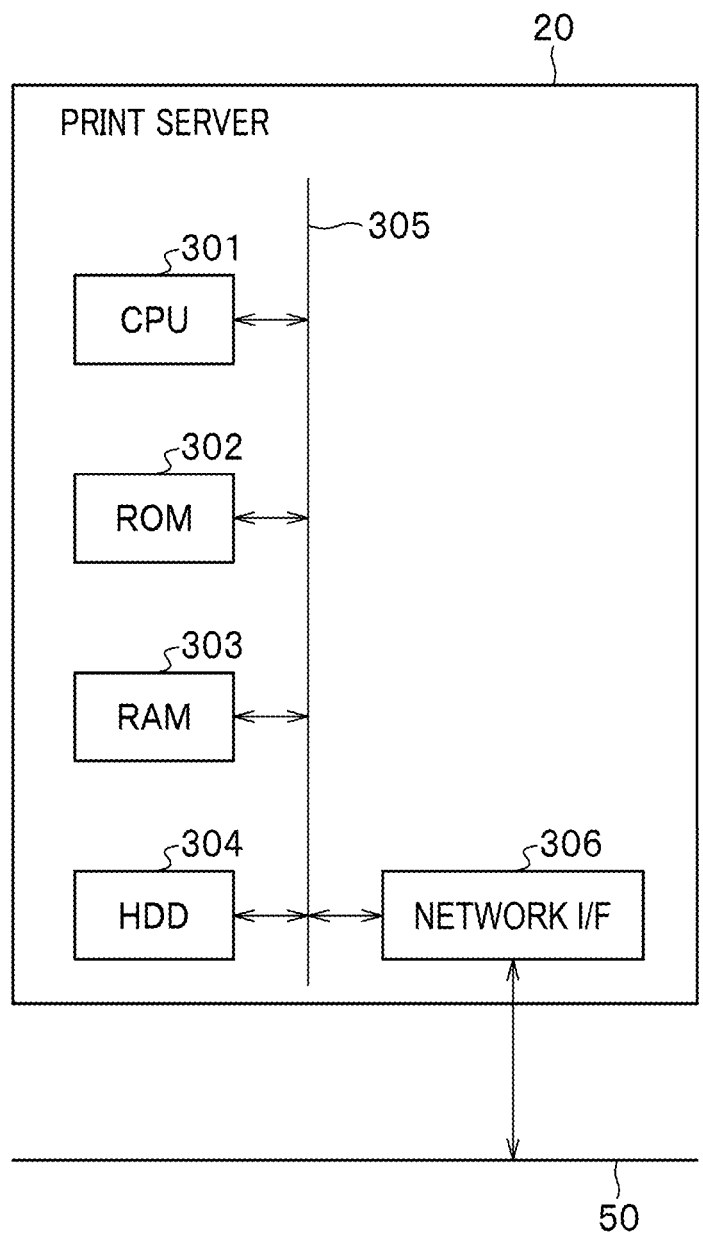
FIG. 3 is a block diagram showing an example of a hardware configuration of a print server according to the present embodiment.

FIG. 3 is a block diagram showing an example of a hardware configuration of the print server 20.

The print server 20 performs processes necessary for execution of the print process, such as analysis of an entered print job and an expansion into image data. The print server 20 includes a CPU 301, a ROM 302, a RAM 303, a hard disk (HDD) 304, and a network I/F 306. Each device is connected with each other by a system bus 305.

The CPU 301 integrally controls access to various devices connected to the system bus 305 based on a control program stored in the ROM 302 or the HDD 304. The ROM 302 stores control programs that is able to be executed by the CPU 301. The RAM 303 mainly works as a main memory, a work area, and the like of the CPU 301, and can be expanded in its capacity using an optional RAM connected to an expansion port (not shown). The HDD 304 stores a boot program, various application programs, font data, user files, edition files, print job data, and the like. Although the HDD 304 is used as an external storage in this embodiment, the external storage such as an SD card or a flash memory may be used in addition to the HDD 304.

The network I/F 306 performs data communication with the network 50 via a network cable. The network I/F 306 transmits information necessary for the print control (print settings) and image data output from the print server 20 to the image forming apparatus 10.

As described above, the print server 20 may relay communication between the image forming apparatus 10 and the network 50. At this case, in the print server 20, data communication with the image forming apparatus 10 is performed by the control system I/F, and data communication with the network 50 is performed by the network I/F.

[Hardware Configuration of Productivity Management Terminal]

Figure 4:
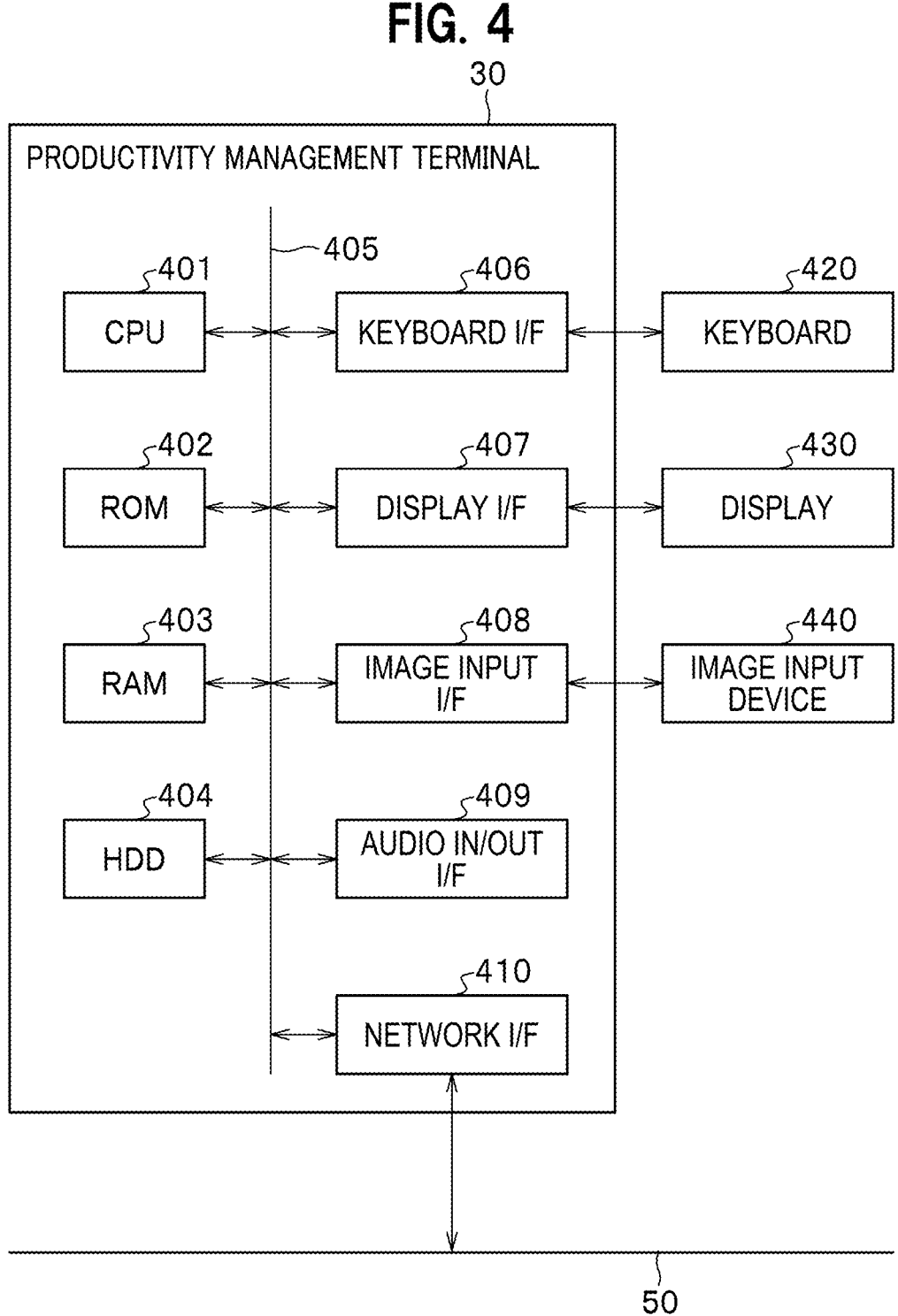
FIG. 4 is a block diagram showing an example of a hardware configuration of a productivity management terminal according to the present embodiment.

FIG. 4 is a block diagram showing an example of a hardware configuration of a productivity management terminal 30.

The productivity management terminal 30 includes a CPU 401, a ROM 402, a RAM 403, a hard disk (HDD) 404, a keyboard I/F 406, a display I/F 407, an image input I/F 408, an audio input/output I/F 409, and a network I/F 410. Each device is connected to each other via a system bus 405.

Functions of the CPU 401, the ROM 402, the RAM 403, and the HDD 404 are the same as those of the corresponding devices of the print server 20, and therefore, detailed description thereof is omitted.

The keyboard I/F 406 controls key input from a keyboard 420 or a pointing device (not shown). The display I/F 407 controls display on the display 430. The image input I/F 408 controls image input from an image input device 440 such as a camera. The audio input/output I/F 409 controls audio input/output of an audio input/output device such as a microphone, a speaker, and a headset (not shown).

The network I/F 410 performs data communication with the network 50 via a network cable. As described above, the productivity management terminal 30 may be configured to communicate with the image forming apparatus 10 via the print server 20.

[Hardware Configuration of Information Processing Apparatus]

Figure 5:
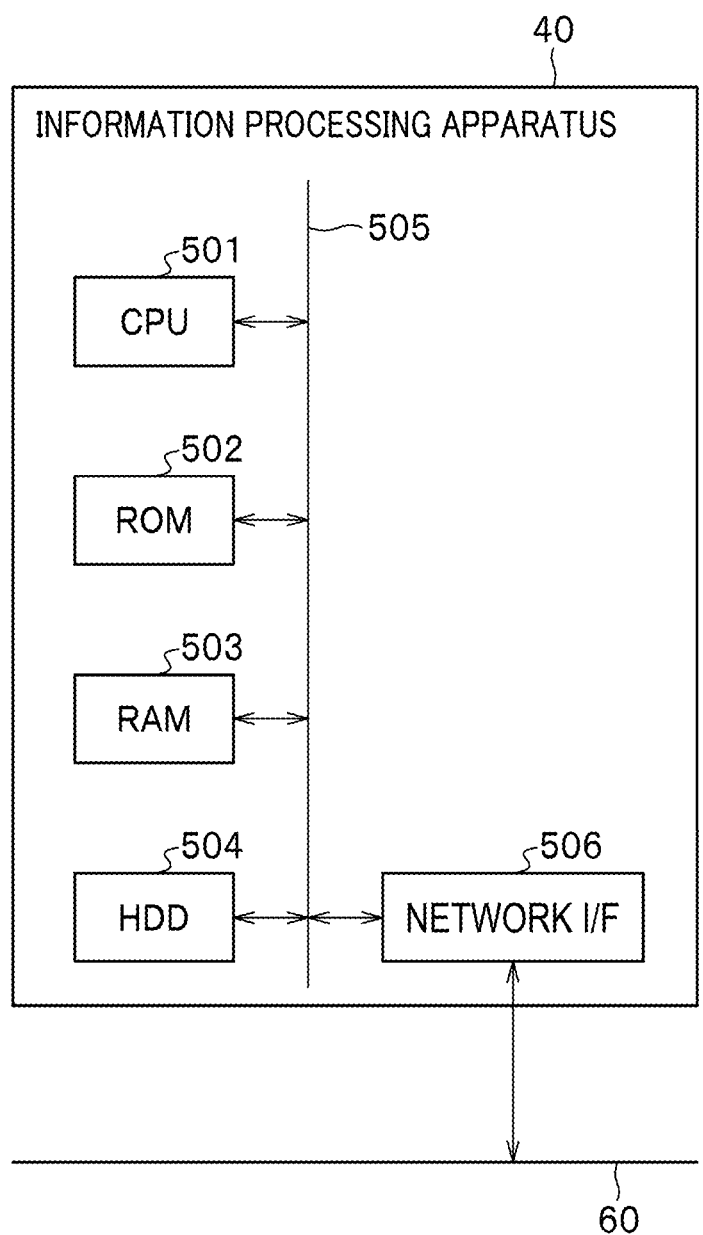
FIG. 5 is a block diagram showing an example of a hardware configuration of an information processing apparatus according to the present embodiment.

FIG. 5 is a block diagram showing an example of a hardware configuration of an information processing apparatus 40.

The information processing apparatus 40 includes a CPU 501, a ROM 502, a RAM 503, a hard disk (HDD) 504, and a network I/F 506. Each device is connected with each other by a system bus 505.

Functions of the CPU 501, the ROM 502, the RAM 503, and the HDD 504 are the same as those of the corresponding devices of the print server 20, and therefore, detailed description thereof is omitted.

The network I/F 506 performs data communication with the network 60 via a network cable. As described above, the network 50 and the network 60 may be a single network. Further, the information processing apparatus 40 may be configured to communicate with the image forming apparatus 10 via the print server 20.

[Functional Configuration of Image Forming Apparatus]

Figure 6:
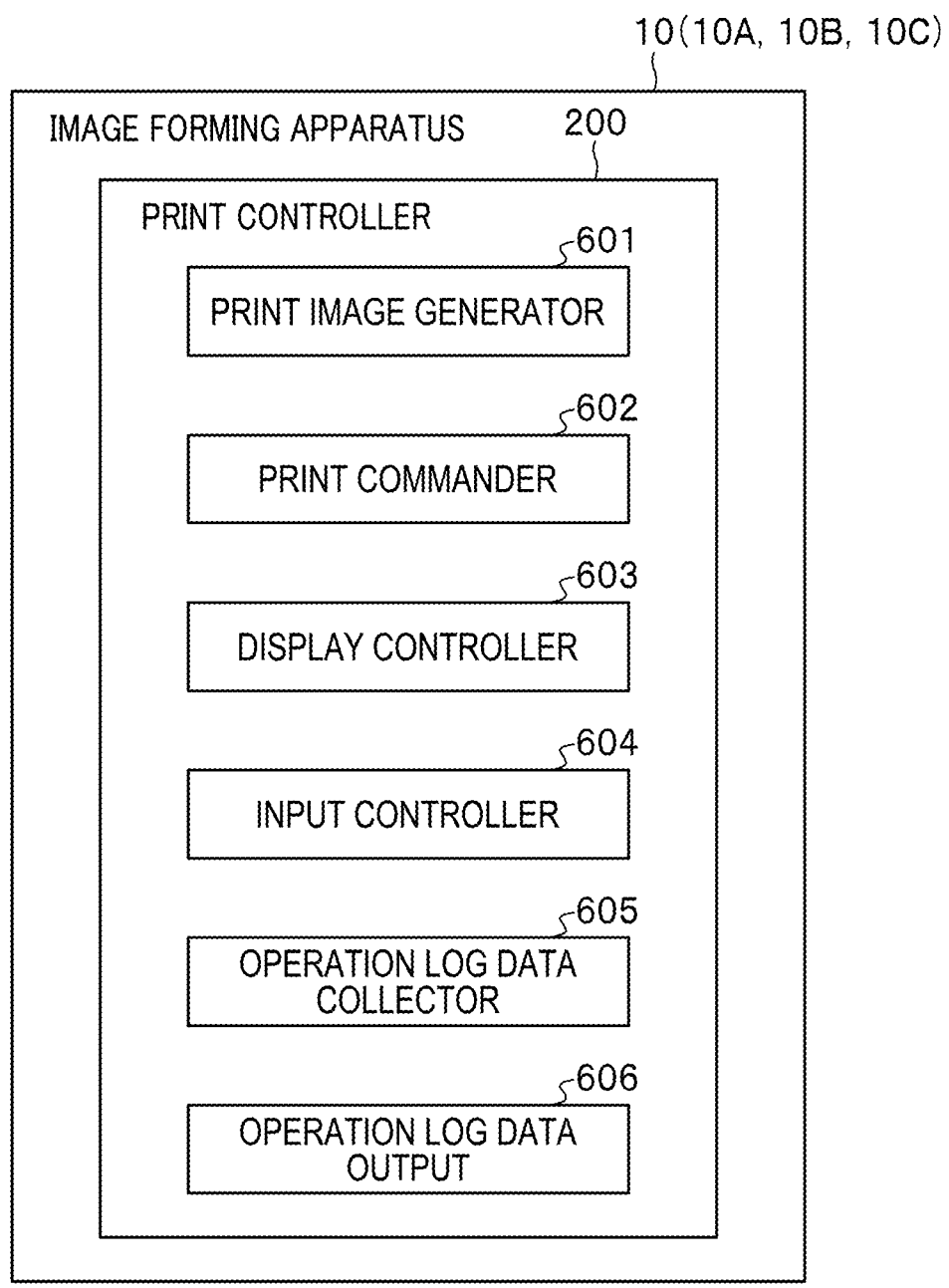
FIG. 6 is a block diagram showing an example of a functional configuration of an image forming apparatus according to the present embodiment.

FIG. 6 is a block diagram showing an example of a functional configuration of the image forming apparatus 10.

The print controller 200 of the image forming apparatus 10 includes a print image generator 601, a print commander 602, a display controller 603, an input controller 604, an operation log data collector 605, and an operation log data output controller 606. These functions are implemented by the CPU 201 reading and executing the control program stored in the ROM 202.

The print image generator 601 generates image data necessary for a print operation of the print engine 210 based on the print original data file and the print settings.

The print commander 602 outputs the print settings and the image data to the print engine 210 and instructs an execution of printing.

The display controller 603 controls the display 222 to display a state of the image forming apparatus 10 such as print enabled/disabled, in adjusting color, remaining amount of consumable material, a state of the paper feed tray, and the like.

The input controller 604 receives an input signal corresponding to a user's operation on the input unit 221, and issues instructions to change the print settings, execution of color adjustment, suspension of printing, resumption of printing, and the like.

The operation log data collector 605 collects detection data of sensors in the image forming apparatus 10 including the plurality of sensors 211, operation data of an actuator, and the like, and stores them as operation log data in the RAM 203 or the HDD 204 of the image forming apparatus 10. The operation log data includes not only sporadic error data and abnormality data of image quality during a job execution based on information from sensors or the like, but also all of operation history (power on/off, operation history, user operation history, and the like) and related information of the image forming apparatus 10. For example, the operation log data collector 605 collects, as the operation history and the related information, log data of panel operations of the operation display unit 220, log data of the pull-out/put-in of the paper feed tray, information on the recording material stored in the paper feed tray, log data at start/suspension/end of printing, log data at a time when the door of a main body of the image forming apparatus 10 or a door of the post-processing apparatus (not shown) is opened/closed, and the like.

The operation log data output controller 606 outputs the operation log data stored by the operation log data collector 605 to the information processing apparatus 40 via the networks 50 and 60.

[Functional Configuration of Print Server]

Figure 7:
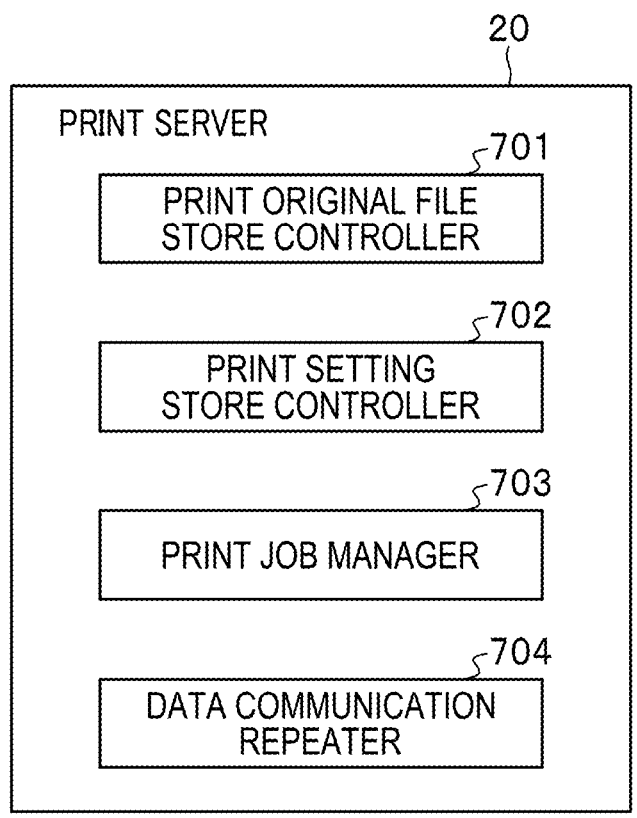
FIG. 7 is a block diagram showing an example of a functional configuration of the print server according to the present embodiment.

FIG. 7 is a block diagram showing an example of a functional configuration of the print server 20.

The print server 20 includes a print original file store controller 701, a print setting store controller 702, a print job manager 703, and a data communication repeater 704. These functions are implemented by the CPU 301 reading and executing the control program stored in the ROM 302.

The print original file store controller 701 stores in the HDD 304 the print original data file transmitted from a user terminal (not shown) by a job management application (print driver).

The print setting store controller 702 associates the print original data stored by the print original data file store controller 701 with print settings necessary for an image data generation and a print process and stores associated settings in the HDD 304.

The print job manager 703 manages print job data received from the user terminal. Specifically, the print job manager 703 performs processing such as retrieving of print job data stored in the HDD 304, reflecting a change in print job settings indicated by a user terminal, and managing a history of a completed print job.

The data communication repeater 704 analyzes data received through the network I/F 306. The data repeater 704 performs a control so that data is relayed between the image forming apparatus 10 and the network 50 when determining that there is data to be relayed therebetween.

[Functional Configuration of Productivity Management Terminal]

Figure 8:
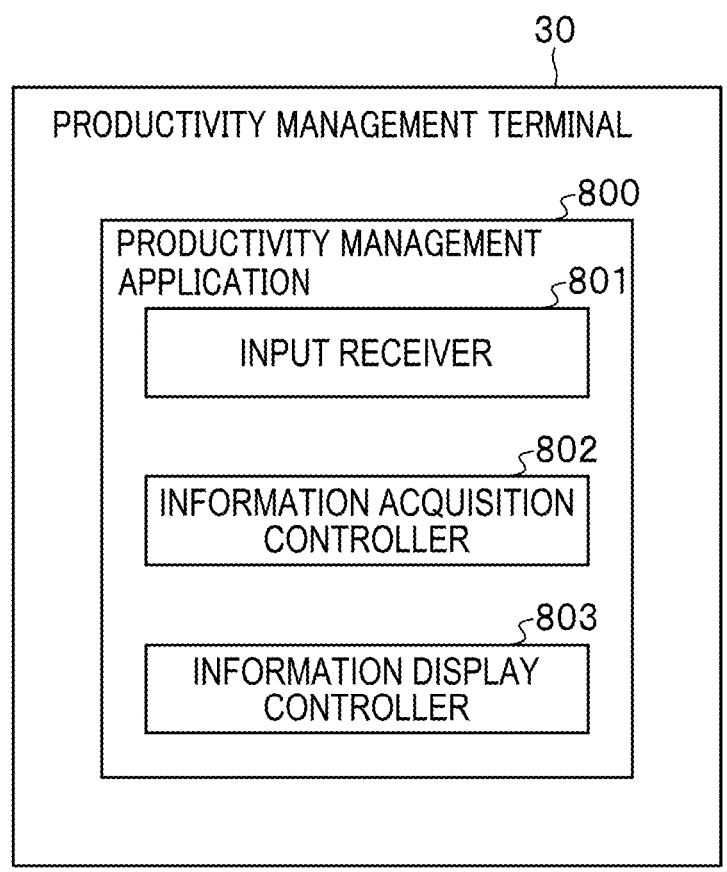
FIG. 8 is a block diagram showing an example of a functional configuration of the productivity management terminal according to the present embodiment.

FIG. 8 is a block diagram showing an example of a functional configuration of the productivity management terminal 30.

The productivity management terminal 30 is provided with a productivity management application 800 installed therein. The productivity management application 800 is a browser for viewing information relating to productivity management, and includes an input receiver 801, an information acquisition controller 802, and an information display controller 803. Functions of these modules are implemented by the CPU 401 reading and executing a control program stored in the ROM 402.

The input receiver 801 includes an interface receiving an operation on the keyboard 420 and the like of the productivity management manager. For example, the input receiver 801 receives a request for displaying information related to productivity of the image forming apparatus 10, which includes, but is not limited to, for example, information on a monitoring state of the productivity (analysis result of the operation log data and the like) and information on productivity improvement of (analysis result of the operation log data, improvement measures and the like).

The information acquisition controller 802 acquires information on the productivity of the image forming apparatus 10 from the information processing apparatus 40 based on a user operation or the like received by the input receiver 801.

The information display controller 803 displays requested information on the display 430 based on information about the productivity of the image forming apparatus 10 that the information acquisition controller 802 acquires from the information processing apparatus 40.

[Functional Configuration of Information Processing Apparatus]

Figure 9:
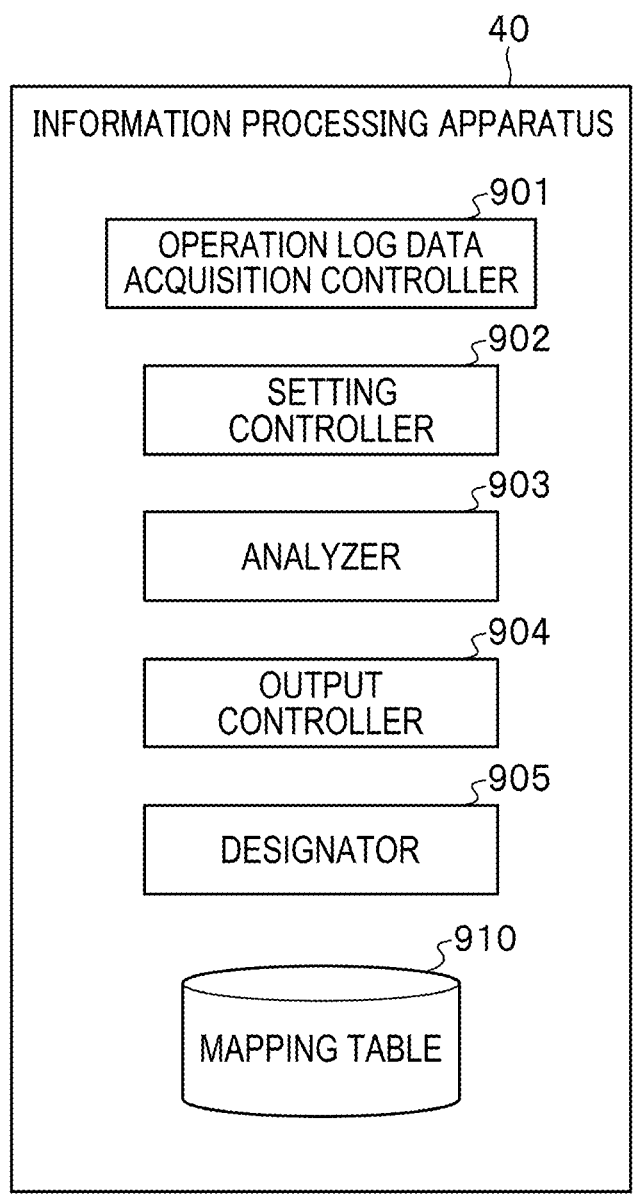
FIG. 9 is a block diagram showing an example of a functional configuration of the information processing apparatus according to the present embodiment.

FIG. 9 is a block diagram showing an example of a functional configuration of the information processing apparatus 40.

The information processing apparatus 40 includes an operation log data acquisition controller 901, a setting controller 902, an analyzer 903, an analysis result output controller 904 (output controller), and a designator 905. Functions of these units are implemented by the CPU 501 reading and executing a control program stored in the ROM 502. In addition, the information processing apparatus 40 stores a mapping table 910.

The operation log data acquisition controller 901 acquires the operation log data from the image forming apparatus 10 and stores the operation log data in the HDD 404. The operation log data acquisition controller 901 collects the operation log data from one or more image forming apparatuses 10 connected to the network 50 at a predetermined time interval such as several msec.

The setting controller 902 sets setting information to the image forming apparatus 10. The setting information is information set in order for the image forming apparatus 10 to perform a print process according to a print job. The setting information includes, but is not limited to, setting values of: settings relating to a paper feed tray (e.g., an identifier of a paper feed tray used for printing); settings relating to a print paper (e.g., type of recording material, paper size); and settings relating to automatic quality optimization (e.g., settings for automatic adjustment before printing, for a real-time corrector during printing; and for in-line automatic inspection); and the like Further, the setting controller 902 can change the setting information, for example, according to a request (input) from the productivity management terminal 30. Changing the setting information can be an option to change the productivity of the image forming apparatus 10. Therefore, changing the setting information for improving the productivity of the image forming apparatus 10 can be an improvement measure. Further, the setting information is an aggregate of a plurality of types of setting values (setting items) as described above, and choices in which a plurality of types of setting values are changed can be prepared.

The analyzer 903 analyzes the operation log data of the image forming apparatus 10. The analyzer 903 can analyze the operation log data stored in the HDD 404 in a background of the operation log data acquisition controller 901. Further, the analyzer 903 can analyze the operation log data of the image forming apparatus 10 to obtain result information when specific setting information is set in the image forming apparatus 10. The result information is observable information indicating an execution result of a print process shown by the image forming apparatus 10, and can be a parameter for evaluating the productivity achieved by the image forming apparatus 10. The result information includes, for example, a frequency of occurrences of errors in a print job, an interruption time of the print job due to an error, the number of defective sheets of a printed matter, and the number of reprinting, but is not limited thereto. The analyzer 903 can aggregate the operation log data to acquire the result information.

The result information is observed according to the setting information being set. When the setting controller 902 changes the setting information, the result information is varied even in the same print process. When the setting controller 902 changes the setting information from the first setting information (the setting information before the change) to the second setting information (the setting information after the change), the analyzer 903 is able to obtain as the first result information the result information when the first setting information is set, and to obtain as the second result information the result information when the second setting information is set. The analyzer 903 is able to obtain difference information between the first result information and the second result information. The difference information is a change amount of the result information caused by the change of the setting information and observable information.

The analysis result output controller 904 outputs the analysis result from the analyzer 903 in response to a request (request for productivity of the image forming apparatus 10) from the productivity management terminal 30. For example, the analysis result output controller 904 is able to output the result information, transmit it to the productivity management terminal 30, and present it to the productivity management manager. Further, when the setting controller 902 changes the setting information in response to a request from the productivity management terminal 30, the analysis result output controller 904 is able to output the difference information as the change amount of the result information caused by the change of the setting information, transmit the difference information to the productivity management terminal 30, and present it to the productivity management manager. Furthermore, the analysis result output controller 904 may output the change content of the setting information as an option for changing the productivity of the image forming apparatus 10 (for example, an analysis result screen shown in FIG. 10 and the like), transmit it to the productivity management terminal 30, and present it to the productivity management manager (details is described below).

The designator 905 accepts a designation of a specific condition for the analysis result of the analyzer 903 from the productivity management terminal 30. For example, the designator 905 can perform a processing so that the productivity management terminal 30 can designate as the first period a period in which the first result information is acquired when the first setting information (setting information before change) is set. Further, the designator 905 can perform a processing so that the productivity management terminal 30 can designate as the second period a period in which the second setting information (setting information after change) is acquired when the second result information is set. The analyzer 903 can obtain the first result information within the first period that is set for the first setting information, and the second result information within the second period that is set for the second setting information.

Further, for example, the designator 905 can perform a processing so that the productivity management manager can designate an option that has been actually selected by the manager (improvement measure that has been actually executed) in options displayed as the analysis result by the analyzer 903. The designator 905 can output the analysis result provided with an input field for selecting the option to transmit the analysis result to the productivity management terminal 30.

The mapping table 910 is a table showing a correspondence between setting items of the setting information and performance items of the result information. The result information is an aggregate of a plurality of types of performance items, and each of the result items is an observable performance value. As described above, because the result information is observed by a cause of the setting information being set, the result information becomes a parameter for confirming an effect of changing the setting information. Here, the correspondence between which result item is changed when which setting item is changed is determined and registered in the mapping table 910. Details of the mapping table 910 is described below.

[Analysis Result Screen of Operation Log Data]

Next description is given of an analysis result screen of the operation log data of the image forming apparatus 10 displayed on the productivity management terminal 30 with reference to FIG. 10.

FIG. 10 is a diagram showing an example of a screen displayed on the productivity management terminal 30 presenting an analysis result of operation log data of the image forming apparatus 10. When the productivity management manager starts the productivity management application (browser) and logs in, the productivity management terminal 30 accesses the information processing apparatus 40, and displays the analysis result screen 1000 on the top screen. The analysis result screen 1000 presents an analysis result by the analyzer 903.

The analysis result screen 1000 displays one week of analysis result reports, 1010, 1020, and 1030. Each of the analysis result reports 1010,1020, and 1030 have one or more analysis results (records) 1011,1021, and 1031. The analysis result report may include the first analysis result (option) for one week (for example, last week) when the first setting information (setting information before change) is set and the second analysis result (option) for one week (for example, this week) when the second setting information (after change) is set. The designator 905 can perform the processing so that the productivity management terminal 30 can designate the first analysis result and the second analysis result. In other words, the productivity management manager can specify through the productivity management terminal 30 so that the analysis results of the previous week and this week are output.

In the example of FIG. 10, the analysis result includes fields of "implementation confirmation", "proposal", "proposal type", "analysis type", "expected effect", and "proposal summary".

The "implementation confirmation" indicates whether or not the option (improvement measure) indicated in the corresponding analysis result has been executed. When executed, a check mark is added on the column of the check box in FIG. 10. The designator 905 can prepare columns of the "implementation confirmation" and a check box capable of designating each of the options on the analysis result screen 1000. The productivity management manager can check the check box of the executed option on the analysis result screen 1000 that is transmitted to and displayed on the productivity management terminal 30.

The "proposal" displays graphical symbols such as pictograms (graphical symbols 1101 to 1102 in FIG. 11) so that contents of the proposal can be understood at a glance. Proposals are broadly divided into two types of proposals (reports): improvement measures (improvement actions) for improving productivity, and analysis and discovery.

The "proposal type" indicates a type of proposal content shown in the "proposal" column (graphic symbols 1103 to 1106 in FIG. 11).

The "analysis type" indicates a classification of a factor of a productivity decrease identified by the analysis (graphic symbols 1107 to 1109 in FIG. 11).

The "expected effect" refers to an effect expected by implementing the improvement measures. The expected effect is expressed as "nn minutes/day" or "nn minutes/week" and indicates how many minutes of productivity is expected to be improved respectively per day or week. The indication of "nn minutes/day" or "nn minutes/week" can be varied depending on the operation result of the image forming apparatus 10.

The "proposal summary" shows a summary of proposals (reports) for improvement measures and analysis/discovery. The "proposal summary" shows for example, an operation result (for example, a print interruption time, a print preparation time, and a print time) of a specific machine such as an image forming apparatus, improvement measures for improving the operation result (change of setting information), effects (for example, a time by which the print interruption time is shortened) obtained by implementing the improvement measures, and the like.

Here is given description of a legend of graphical symbols displayed on the analysis result screen with reference to FIG. 11.

FIG. 11 shows a legend of graphical symbols displayed on the analysis result screen. These graphic symbols are used in other purposes than the analysis result screen.

<Proposal>

The graphic symbol 1101 is a picture representing a miniature lightbulb to indicate a proposal or report of an improvement action (improvement measure).

The graphic symbol 1102 is a picture representing a magnifying glass to indicate a proposal or report of analysis and discovery.

<Proposal Type>

The graphic symbol 1103 is a picture representing a person to indicate a proposal or report regarding an operation.

The graphic symbol 1104 is a picture representing a printing machine to indicate a proposal or report regarding the machine.

The graphic symbol 1105 is a picture representing a corrugated paper to indicate a proposal or report regarding a material.

The graphic symbol 1106 is a picture representing a management cycle to indicate a proposal or report regarding a method or process.

The graphic symbols 1103 to 1106 represent resources used in execution of a work, the so-called four elements of production (Man, Machine, Material, and Method).

<Analysis Type>

The graphic symbol 1107 is a picture representing a printing machine and an hourglass to show a proposal or report regarding a print interruption time.

The graphic symbol 1108 is a picture representing a power standby and an hourglass to show a proposal or report regarding an operating time.

The graphic symbol 1109 is a picture representing a manual feed tray and an hourglass to show a proposal or report regarding a print preparation time.

[Details on Changing Setting Information]

Next is detailed description of a case in which the setting controller 902 changes the setting information. FIG. 12 is an example of a data structure diagram of the mapping table 910. As shown in FIG. 12, the mapping table 910 shows the correspondence between the setting items of the setting information and the result items of the result information. In other words, the mapping table 910 shows a correspondence in which when which setting item is changed, which result item is observed as a change item. In addition, the setting items can be classified into a plurality of types, and FIG. 12 shows setting items relating to "paper setting" and "settings of automatic quality optimization function", but the types of the setting items are not limited thereto.

The "paper setting" includes "setting of automatic switching of paper feed tray" and "paper-related setting such as paper profile setting", but is not limited thereto. The "setting of automatic switching of paper feed tray" is a setting for selecting a paper feed tray to be used for the print process. The "paper-related setting such as paper profile setting" is a setting for selecting a recording material used for the print process.

The result items corresponding to the setting items of "setting of automatic switching of paper feed tray" and "paper-related setting such as paper profile setting" are "corresponding setting of panel: ON/OFF", "paper detection in paper feed tray", "processed job list", "calculation of improvement measure introduction rate", "error frequency", and "interruption time due to error".

the "corresponding setting of panel: ON/OFF" is a result item for the paper feed tray and the paper displayed on the operation panel of the image forming apparatus 10. The result value of "corresponding setting of panel: ON/OFF" has two values of ON (available) and OFF (unavailable).

The "paper detection in paper feed tray" is a result item for detection of a paper stored in the paper feed tray.

The "processed job list" is a result item for a job to be subjected to the print process, specifically, a job log or a job history.

The "calculation of improvement measure introduction rate" is a result item for a improvement measure introduction rate (introduction rate) which is a rate of machines (such as the image forming apparatus 10) that have introduced improvement measures by changing the setting information. The improvement measure introduction rate can be obtained, for example, as a rate of the number of improvement measure-introduced machines (5/7) indicating a rate of the number (for example, 5 apparatuses) of image forming apparatuses 10 on which improvement measures have been implemented (ON) out of a total number (for example, 7 apparatuses) of image forming apparatuses 10. Alternatively, the improvement measure introduction rate can be obtained as the numbers (for example, 20 times) of implementation of the improvement measures within a predetermined period (for example, one week).

The "error frequency" is a result item regarding the number of errors in the print process.

The "interruption time due to error" is a result item for a time during which the print process has been interrupted due to an error in the print process.

The "settings of automatic quality optimization function" includes setting items relating to "automatic front/back adjustment" and "automatic adjustment of maximum density and density balance", but is not limited thereto. The "automatic front/back adjustment" is a setting for selecting an automatic front/back adjustment function that is one of the automatic quality optimization functions. The "automatic adjustment of maximum density and density balance" is a setting for selecting a density adjustment function that is one of the automatic quality optimization functions.

The setting item of the "automatic front/back adjustment" corresponds to the result items including "automatic front/back adjustment setting of panel: ON/OFF", "frequency of manual adjustment", "frequency of automatic front/back adjustment", "adjustment time of front/back adjustment", "sample print count", and "number of quality defective sheets due to front/back adjustment error".

The "automatic front/back adjustment setting of panel: ON/OFF" is a result item for the automatic front/back adjustment displayed on the operation panel of the image forming apparatus 10. Result values of the "automatic panel adjustment setting: ON/OFF" are two values of ON (available) and OFF (unavailable).

The "numbers of manual adjustment" is a result item with respect to the numbers of manual front/back adjustment having the same function as the automatic front/back adjustment function.

The "numbers of automatic front/back adjustment" is a result item for the numbers of executing the automatic front/back adjustment function.

The "adjustment time for front/back adjustment" is a result item for a time required for front/back adjustment (time required from a start of adjustment to a final printing).

The "sample print count" is a result item for the number of sample prints used for the front/back adjustment.

The "number of quality defective sheets due to front/back adjustment error" is a result item for the number of recording materials printed due to misalignment of front and back.

The result items corresponding to the setting item of the "automatic adjustment of maximum density and density balance" include: "automatic adjustment setting of panel: ON/OFF", "frequency of manual adjustment", "frequency of automatic adjustment", "adjustment time", "frequency of sample print", "frequency of image quality stabilization", "output sheet number for color adjustment and measurement chart", "number of quality defective sheets due to color unevenness and streak", "number of maintenance due to uneven color and streak", "machine stop time due to uneven color and streak", "number of reprint due to uneven color and streak", and "reprint time due to uneven color and streak".

The "automatic adjustment setting of panel: ON/OFF" is a result item corresponding to the setting item of the automatic density adjustment displayed on the operation panel of the image forming apparatus 10. The result value of the "automatic adjustment setting of panel: ON/OFF" is two values of ON (available) and OFF (unavailable).

The "frequency of manual adjustment" is a result item with respect to the numbers of manually performing the density adjustment corresponding to the automatic density adjustment function.

The "frequency of automatic adjustment" is a result item corresponding to the numbers of execution of the automatic density adjustment function.

The "adjustment time" is a result item for the time required for the density adjustment.

The "frequency of sample print" is a result item for the numbers of sample prints used for the density adjustment.

The "frequency of image quality stabilization" is a result item for the numbers of image quality stabilization executed for the density adjustment.

The "output sheet number for color adjustment and measurement chart" is a result item for the number of color adjustment/measurement charts output for the density adjustment.

The "number of quality defective sheets due to color unevenness and streak" is a result item with respect to the number of recording materials printed with color unevenness or streaks.

The "frequency of maintenance due to color unevenness and streak" is a result item for the numbers of maintenance performed to solve problems of color unevenness or streaks.

The "machine stop time due to color unevenness and streak" is a result item for a stop time of the image forming apparatus 10 due to troubles of color unevenness or streaks.

The "number of reprint due to uneven color and streak" is a result item for the numbers of reprints due to color unevenness and streak.

The "reprint time due to color unevenness and streak" is a result item for the time required for reprinting in response to color unevenness and streaks.

<Acquiring Difference Information (Part 1)>

It is assumed for description convenience that the productivity management manager determines to implement one of the improvement measures for the nth week displayed on the analysis result screen 1000 (see FIG. 10) that the analysis result output controller 904 outputs to the productivity management terminal 30, and requests the information processing apparatus 40 to perform the improvement measures determined. For example, it is assumed that the improvement measure determined is an improvement measure which prompts a user to change the setting item of the "setting of automatic switching of paper feed tray" shown in the mapping table 910.

The operation log data acquisition controller 901 acquires operation log data of the nth week in which the first setting information for the nth week is set, and the analyzer 903 analyzes the operation log data of the nth week to obtain an analysis result of the nth week. The analysis result of the nth week contains mainly the first result information including result items such as "corresponding setting of panel: ON/OFF", "paper detection in paper feed tray", "processed job list", "calculation of improvement measure introduction rate", "error frequency", and "interruption time due to error") corresponding to the setting item of "automatic paper feed tray switch setting" by the mapping table 910. When the productivity management terminal 30 requests to the information processing apparatus 40, the productivity management manager can view the result information.

The setting controller 902 changes the setting items of the "automatic paper feed tray switch setting" shown in the mapping table 910 according to the improvement measures to be implemented, and changes the setting item from the first setting information (for the nth week) to the second setting information (for the (n+1)th week). When a print process is executed by the image forming apparatus 10 during the (n+1)th week, the operation log data acquisition controller 901 acquires the operation log data of the (n+1)th week during which the second setting information (for the (n+1)th week) is set. The analyzer 903 analyzes the operation log data of the (n+1)th week to obtain an analysis result for the (n+1)th week. The analysis result for the (n+1)th week includes the second result information including the result items such as "corresponding setting of panel: ON/OFF", "paper detection in paper feed tray", "processed job list", "calculation of improvement measure introduction rate", "error frequency", and "interruption time due to error" associated with the setting item of the setting "automatic paper feed tray switch setting" by the mapping table 910. Further, the analyzer 903 obtains difference information between the first result information of the nth week and the second result information of the (n+1)th week as the analysis result. The difference information includes changes in result values of the result items such as "corresponding setting of panel: ON/OFF", "paper detection in paper feed tray", "processed job list", "calculation of improvement measure introduction rate", "error frequency", and "interruption time due to error".

The analysis result output controller 904 outputs the analysis result screen 1000 including the analysis result of the (n+1)th week and the difference information. When the productivity management terminal 30 requests for viewing the analysis result screen 1000 to the information processing apparatus 40, the productivity management manager can view the analysis result screen 1000 to recognize the analysis result and the difference information for the (n+1)th week. The productivity management manager can confirm from the difference information that the productivity of the image forming apparatus 10 has been improved by the change of the setting information, which is indicated by the result information. Therefore, the productivity management manager can have motivation to implement the improvement measures, and can continue the improvement measures to improve the productivity of the image forming apparatus 10.

In response to the request from the productivity management terminal 30, the designator 905 can designate the nth week during which the first result information is acquired and the (n+1)th week during which the second result information is acquired.

Further, in response to the request from the productivity management terminal 30, the designator 905 can check the "implementation confirmation" column of the analysis result screen 1000 for the improvement measures implemented by the productivity management manager.

<Acquiring Difference Information (Part 2)>

As described above, the productivity management manager can cause the setting controller 902 to change the setting information according to the improvement measures displayed on the analysis result screen 1000. However, the productivity management manager can cause the setting controller 902 to change any setting item of the setting information at his/her own judgment without depending on the improvement measures displayed on the analysis result screen 1000. The analyzer 903 obtains an analysis result under the setting information after the change, and can obtain difference information caused by the change of the setting information. The productivity management manager can view the analysis result screen 1000 to recognize the difference information and to determine whether or not the productivity by the image forming apparatus 10 has been improved.

<Acquiring Difference Information (Part 3)>

An aggregation of every week analysis results displayed on the analysis result screen 1000 may include some analysis results reflecting result information before and after the change of the setting information because the setting controller 902 may change the setting information at a certain time in the past. When the productivity management terminal 30 requests the information processing apparatus 40 to confirm the change of the setting information, the analyzer 903 can specify a timing of the change of the setting information, acquire the result information (analysis result) before and after the change timing, and determine the difference information caused by the change of the setting information. The productivity management manager views the analysis result screen 1000 including the analysis results before and after the change timing of the setting information, and recognizes the difference information to determine whether or not the productivity of the image forming apparatus 10 has been improved by the change of the setting information. In addition, the designator 905 can designate an acquisition period of the result information before and after the change timing of the setting information.

[Productivity Management Process]

Figure 13:
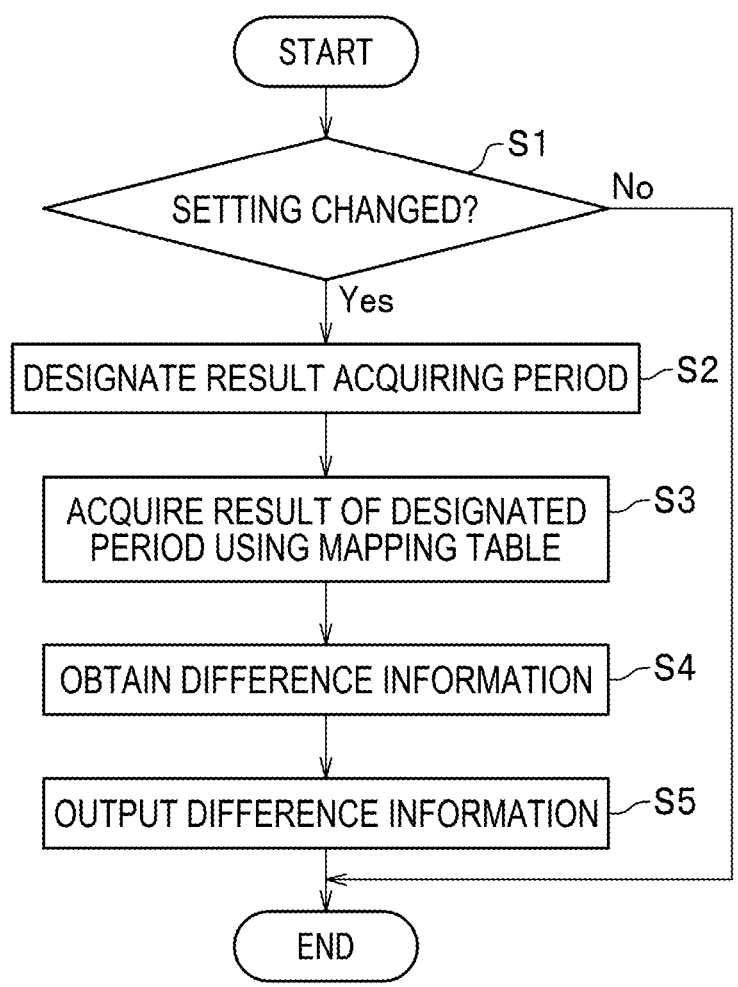
FIG. 13 is a flowchart showing a procedure example of productivity management process performed by the information processing apparatus according to the present embodiment.

Next description is given of the productivity management process by the information processing apparatus 40 according to the present embodiment. FIG. 13 is a flowchart showing a procedure example of the productivity management process of the information processing apparatus according to the present embodiment. It is assumed that the operation log data acquisition controller 901 of the information processing apparatus 40 periodically acquires the operation log data from the plurality of image forming apparatuses 10 (machines) in a whole factory (or a whole printing company or the like) and stores the operation log data in the HDD 504. The productivity management process is started, for example, when a request is made from the productivity management terminal 30 to the information processing apparatus 40.

First, the analyzer 903 analyzes the operation log data and determines whether or not the setting information has been changed by the setting controller 902 (step S1). When the setting information has not been changed (No in step S1), the productivity management process is terminated. On the other hand, when the setting information has been changed (Yes in step S1), the designator 905 designates a period for acquiring the result information (step S2). The designated period is a period including the change timing of the setting information, and may be, for example, one week before and after the change timing of the setting information which timing is a center of the period, that is, a total of two weeks. Further, the designator 905 can designate the period according to a request from the productivity management terminal 30.

Next, the analyzer 903 acquires the result information of the designated period according to the mapping table 910 (step S3). The analyzer 903 specifies whether or not any setting item of the setting information has been changed by the setting controller 902. Further, the analyzer 903 refers to the mapping table 910 to specify a result item corresponding to the setting item changed. Furthermore, the analyzer 903 acquires at least a result value of the result item specified among the result information to be acquired.

Next, the analyzer 903 obtains difference information from the result information acquired (step S4). Specifically, the analyzer 903 aggregates the result information before the change of the setting information and the result information after the change of the setting information, and calculates a difference between the two aggregation results. Next, the analysis result output controller 906 outputs the difference information obtained by the analyzer 903 (step S5). Specifically, the analysis result output controller 906 outputs to the productivity management terminal 30 the information of the analysis result screen 1000 including the difference information. The productivity management manager can view the analysis result screen 1000 and obtain the difference information through the productivity management terminal 30.

Here, the description of the productivity management process is completed.

[Specific Example (1) of Improvement Action]

Next, description is given of what the information processing apparatus 40 of the present embodiment acts for implementing the improvement measures, that is, a specific example of an improvement action.

The specific example (1) of the improvement action is an example of improving a frequency of paper feeding due to out off sheets. For example, an improvement action is explained in which a plurality of paper feed trays are made to be used when a print process is executed by a large lot (5,000 pages or more) of a print job. The information processing apparatus 40 receives a request for performing an improvement action from the productivity management terminal 30. The analyzer 903 refers to the mapping table 910 and acquires a result value of the result item corresponding to the setting item of "setting of automatic switching of paper feed tray". Specifically, the analyzer 903 detects a timing when the automatic switching of the paper feed tray is turned ON in the setting of the operation panel of the image forming apparatus 10 and a frequency of switching ON/OFF. Further, the analyzer 903 checks that a plurality of paper feed trays are filled with the same recording material.

Further, the analyzer 903 refers to a job list managed by the print server 20 to detects a situation in which a large lot of print job is waiting and a situation in which a plurality of jobs using the same recording material are waiting. The analyzer 903 makes association of the detected job with the paper feed tray to which the automatic switching setting is to be performed, and uses the association as a basis for performing the improvement action. The analyzer 903 obtains difference information by analyzing the operation log data to acquire and compare the frequencies of error occurrences and interruption times due to out-of-paper before and after implementing the improvement action. The analysis result output controller 904 outputs the difference information regarding the frequencies of error occurrences and the interruption times due to out-of-paper as an analysis result. When the productivity management terminal 30 receives the analysis result from the information processing apparatus 40, the productivity management manager can operate the productivity management terminal 30 to confirm the analysis result.

FIG. 14 is a screen example of the specific example (1) of the improvement action. When the image forming apparatus 10 executes a print process of the large lot of print job, an improvement action of turning the "setting of automatic switching of paper feed tray" to ON has been carried out in the last week. The interruption time due to the out-of-paper has been 182 minutes/week in the two weeks ago, which is the week before the improvement action is conducted. On the other hand, the interruption time due to the out-of-paper has been 152 minutes/week in the last week after the implementation of the improvement action is conducted. The implementation of the improvement action has reduced the interruption time due to out-of-paper by 30 minutes. The analysis result output controller 904 outputs an analysis result that summarizes the interruption time due to the out-of-paper in the week before the last: 182 minutes/week; the interruption time due to the out-of-paper in the last week: 152 minutes/week; and an improvement effect, that is, 30 minutes corresponding to the difference information. The productivity management manager can view the screen 1400 showing the analysis result through the productivity management terminal 30 to confirm that the improvement effect of 30 minutes has been obtained.

In the specific example (1), the analyzer 903 acquires and aggregates data for two weeks in total, that is, the data for one week before the setting information changes and the data for one week after the setting information changes in order to measure an effect. Note that the data acquisition period is not limited to a weekly base, but may be, for example, a monthly base (a total of two months including one month before change and one month after change).

Further, the analyzer 903 may calculate a improvement measure introduction rate as a result item to obtain an improvement effect (difference information). The improvement measure introduction ratio is, for example, a ratio of the number of image forming apparatuses 10 to which the improvement action has been introduced, the numbers of implementing the improvement action for all the image forming apparatuses 10, and a ratio of jobs to which the improvement measures are introduced (a ratio of the number of jobs that cause improvement to the number of all jobs that have been executed). Further, the analyzer 903 can calculate an expected improvement effect when increasing the improvement measure introduction rate (when changing the first introduction rate to the second introduction rate; for example, when increasing by one the image forming apparatuses 10 to which the improvement action has been introduced. Presenting such a prospective improvement effect to the productivity management manager allows the improvement action to be further strengthened or to be continued longer.

Alternatively, the data acquisition period may be set to three months, six months, or one year, and the improvement effect obtained when a continuation period of the improvement action is extended may be presented to the productivity management manager.

[Specific Example (2) of Improvement Action]

The specific example (2) of the improvement action is an example in which the automatic quality optimization function is enabled for improvement. Specifically, description is given of an example of an improvement action of switching from manual front/back adjustment to automatic front/back adjustment when a print process is executed. The information processing apparatus 40 receives a request for performing an improvement action from the productivity management terminal 30. The analyzer 903 refers to the mapping table 910 and acquires a result value of a result item corresponding to a setting item of the "automatic front/back adjustment".

The analyzer 903 analyzes the operation log data to obtain a frequency of manual front/back adjustments and a manual front/back adjustment time (for example, 202 minutes) in a period during which the manual front/back adjustment has been performed (for example, the week before last). Further, the analyzer 903 analyzes the operation log data to obtain a frequency of automatic front/back adjustments and an automatic front/back adjustment time (for example, 121 minutes) in a period (for example, last week) during which the automatic front/back adjustment as the improvement action has been performed. The analyzer 903 obtains difference information using a manual front/back adjustment time (for example, 202 minutes) and an automatic front/back adjustment time (for example, 121 minutes). The analysis result output controller 904 outputs the difference information relating to the front/back adjustment time as an analysis result. When the productivity management terminal 30 receives the analysis result from the information processing apparatus 40, the productivity management manager can operate the productivity management terminal 30 to confirm the analysis result.

FIG. 15 is a screen example of the specific example (2) of the improvement action. Taking improvement action has reduced the front/back adjustment time by 81 minutes. The analysis result output controller 904 outputs the analysis result that summarizes the manual front/back adjustment time: 202 minutes/week in the week before last, the manual front/back adjustment time: 121 minutes/week in the last week, and the improvement effect, that is, 81 minutes/week corresponding to the difference information. The productivity management manager can view the screen 1500 showing the analysis result through the productivity management terminal 30 to confirm that the improvement effect of 81 minutes has been achieved.

[Specific Example (3) of Improvement Action]

The concrete example (3) of the improvement action is an example of improvement by carrying out periodic maintenance (at a short time of about 20 minutes). The maintenance includes, for example, cleaning of the image forming apparatus 10, attachment/replacement of parts, paper setting, image quality adjustment, specific troubleshooting (SC (service call), JAM (paper jamming), or the like), and can be a setting item of the mapping table 910. The result items corresponding to the above setting items include, but are not limited to, "CE maintenance report linkage", "panel setting", "part life parameter value", "frequency of part replacement", "frequency of long-time (for example, 3 hours or more) maintenance", "number of sheet having defective quality due to color unevenness", "JAM frequency", and "machine stop time".

"CE maintenance report linkage" is a result item whose detailed maintenance information can be obtained from a maintenance report by a CE (Customer Engineer/Service Engineer).

The "panel setting" is a result item for a time from when the setting screen of the panel displays the CE operation screen (service mode) to when the screen is closed.

The "part life parameter value" is a result item for a life of a part of the image forming apparatus 10.

The "frequency of part replacement" is a result item for the numbers of part replacements of the image forming apparatus 10 before and after the improvement action is implemented.

The "frequency of long-time (for example, 3 hours or more) maintenance" is a result item of the numbers of long-time maintenance before and after the improvement action is implemented.

The "number of sheet having defective quality due to color unevenness" is a result item for the number of sheets having quality defects due to uneven color, streaks, and the like before and after the improvement action is implemented.

The "JAM frequency" is a result item for the numbers of JAM before and after the improvement action is implemented n.

The "machine stop time" is a result item for the stop time of the image forming apparatus 10 before and after the improvement action is implemented.

The information processing apparatus 40 receives a request for performing an improvement action from the productivity management terminal 30. The analyzer 903 refers to the mapping table 910 to acquire the result values of the result items corresponding to the setting items of the maintenance. The operation log data acquisition controller 901 can acquire as the operation log data the detailed maintenance information shown in the maintenance report by the CE (service engineer).

The analyzer 903 can analyze the operation log data to acquire the maintenance execution time. Therefore, the analyzer 903 can calculate a time from when the operation screen for the CE is displayed to when it is closed based on acquired panel setting data (data relating to a screen setting of a CE-dedicated terminal) before and after the time when the maintenance (short time maintenance of about 20 minutes) is performed.

Further, the analyzer 903 analyzes the operation log data to obtain the life parameter values of the parts and the numbers of the part replacements in a certain period before and after the maintenance execution time (for example, in a case in which the short-time maintenance is started in the last week, a total of two weeks including one week from the week before last to the last week and one week from the last week to the present week).

Further, the analyzer 903 analyzes the operation log data to calculate the numbers of the long-time (three hours or more) maintenance and the machine stop time for maintenance during a certain period before and after the maintenance operation time. If maintenance is performed for an image-quality trouble such as a color unevenness and streak, the analyzer 903 sums up the number of quality-defective sheets and the number times of reprints due to the color unevenness or the streaks within a predetermined time before and after the maintenance.

The analyzer 903 obtains difference information using the above-mentioned result values before and after the maintenance. The analysis result output controller 904 outputs the difference information related to the maintenance execution as an analysis result. When the productivity management terminal 30 receives the analysis result from the information processing apparatus 40, the productivity management manager can operate the productivity management terminal 30 to confirm the analysis result.

Figure 16:
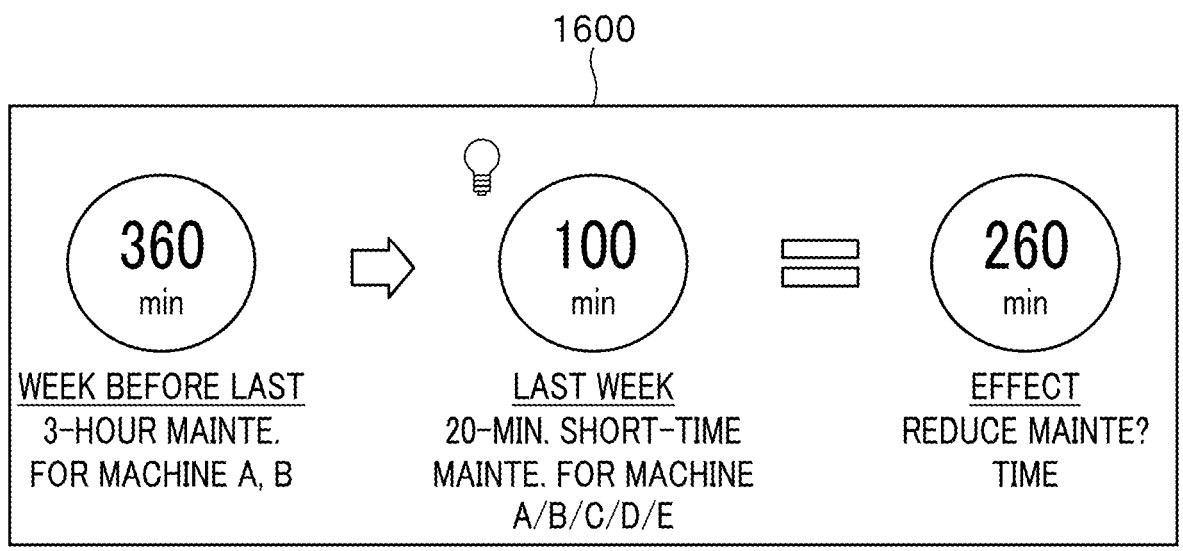
FIG. 16 is a diagram showing a screen example of a specific example (3) of the improvement action.

FIG. 16 is a screen example of the specific example (3) of the improvement action. Taking the improvement action has reduced the maintenance time by 260 minutes. The analysis result output controller 904 outputs an analysis result that summarizes the time required for maintenance (3-hour maintenance for the two image forming apparatuses 10, i.e., machines A and B) in the week before last: 360 minutes, the time required for maintenance (20-minute short-time maintenance for the five image forming apparatuses 10, i.e., machines A to E) in the last week: 100 minutes, and the improvement effect, that is, 260 minutes corresponding to the difference information. The productivity management manager can view the screen 1600 showing the analysis result through the productivity management terminal 30 to confirm that the improvement effect of 260 minutes has been obtained.

[Specific Example (4) of Improvement Action]
<Correction of Patrol Frequency>

The specific example (4) of the improvement action is an example of improvement using a manual for operating the image forming apparatus 10. The manual includes, for example, correction of a look-around frequency fir the image forming apparatus 10, creation of a newcomer targeted manual, correction of a paper setting procedure, and correction of an image quality adjustment procedure, and can be a setting item in the mapping table 910. Result items corresponding to the above setting items include, for example, "comparison between a machine used by a newcomer and a machine used by a practiced person", "comparison of the numbers of mistakes", "frequency of error", and "interruption time due to error", but are not limited thereto.

The "comparison between a machine used by a newcomer and a machine used by a practiced person" is a result item for determining whether a person who uses the image forming apparatus 10 is a newcomer or a practiced person.

The "comparison of the numbers of mistakes" is a result item for the numbers at which the image forming apparatus 10 has not used according to the manual The "frequency of error" is a result item for the numbers of the out-of-paper occurrences before and after the improvement.

The "interruption time due to error" is a result item for the interruption time due to the out-of-paper before and after the improvement.

The information processing apparatus 40 receives a request for performing an improvement action from the productivity management terminal 30. The analyzer 903 refers to the mapping table 910 and acquires the result values of the result items corresponding to the setting items relating to the manual The analyzer 903 analyzes the operation log data (an update timing of the patrol frequency can be identified) to acquire the numbers of error occurrences (for example, the numbers of the out-of-paper: 25 times) and the interruption time due to the error occurrence (for example, 450 minutes) in a period during which the patrol frequency has been once every 20 minutes (one week from the week before last to the last week). Further, the analyzer 903 acquires the numbers of error occurrences (for example, the numbers of the out-of-paper: 3 times) and the interruption time due to the error occurrences (for example, 30 minutes) in a period (one week from the last week to the present week) during which the patrol frequency has been once every 10 minutes. The analyzer 903 obtains difference information using the interruption times due to the error occurrences. The analysis result output controller 904 outputs as an analysis result the difference information relating to the improvement of the look-around frequency. When the productivity management terminal 30 receives the analysis result from the information processing apparatus 40, the productivity management manager can operate the productivity management terminal 30 to confirm the analysis result.

Figure 17:
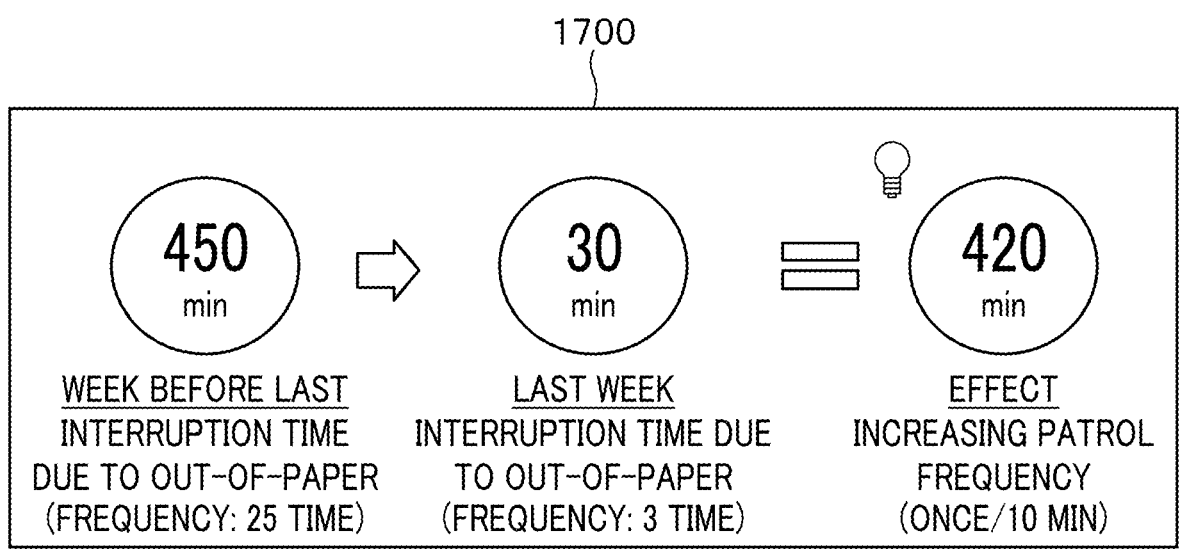
FIG. 17 is a diagram showing a screen example (1) of a specific example (4) of the improvement action.

FIG. 17 is a screen example (1) of the specific example (4) of the improvement action Taking improvement action has reduced the interruption time due to error by 420 minutes. The analysis result output controller 904 outputs the analysis result in which the interruption time due to out-of-paper in the week before last: 450 minutes, the interruption time due to out-of-paper in the last week: 30 minutes, and the improvement effect due to improvement of the patrol frequency (once every 10 minutes), that is, 420 minutes corresponding to the difference information are summarized. The productivity management manager views the screen 1700 showing the analysis result through the productivity management terminal 30 to confirm that the achieved improvement effect has been 420 minutes.

<Making Newcomer Manual>

Further, the analyzer 903 analyzes the operation log data (the timing of making the newcomer manual can be identified) to acquire the numbers of error occurrence and the interruption time due to the errors in a period before making the newcomer manual (one week from the week before last to the last week). Further, the analyzer 903 acquires the numbers of error occurrence and the interruption time due to errors in a period after making the newcomer manual (one week from the last week to the present week). The analyzer 903 obtains difference information relating to the numbers of error occurrence and the interruption time due to errors. The analysis result output controller 904 outputs as an analysis result the difference information relating to making the newcomer manual. When the productivity management terminal 30 receives the analysis result from the information processing apparatus 40, the productivity management manager can operate the productivity management terminal 30 to confirm the analysis result.

Further, when analyzing the operation log data, the analyzer 903 analyzes the operation log data of a machine used by the newcomer and the operation log data of a machine used by the practiced person. The analyzer 903 obtains, as an analysis result, the frequency of error occurrence (e.g., 25 times) and the interruption time due to error occurrence (e.g., 125 minutes) of the machine used by the newcomer in a predetermined period. Further, the analyzer 903 obtains, as an analysis result, the numbers of error occurrence (for example, 5 times) and the interruption time due to error occurrence (for example, 25 minutes) of the machine used by the practiced person in the predetermined period. The analysis result output controller 904 outputs analysis results for the machines used by the newcomer and the machines used by the practiced person. When the productivity management terminal 30 receives the analysis result from the information processing apparatus 40, the productivity management manager can operate the productivity management terminal 30 to confirm the analysis result.

Figure 18:
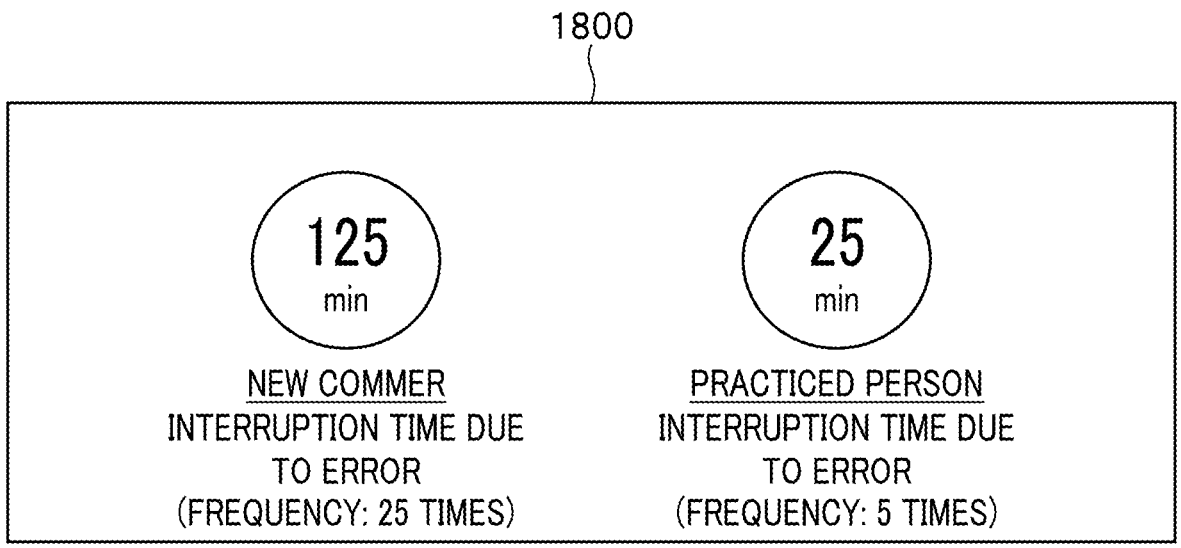
FIG. 18 is a diagram showing a screen example (2) of the specific example (4) of the improvement action.

FIG. 18 is a screen example (2) of the specific example (4) of the improvement action. The analysis result output controller 904 outputs the numbers of error occurrences (for example, 25 times) and the interruption time due to error occurrence (for example, 125 minutes) of the machine used by the newcomer in the predetermined period, and the numbers of error occurrences (for example, 5 times) and the interruption time due to error occurrence (for example, 25 minutes) of the machine used by the practiced person in the predetermined period. The productivity management manager can view the screen 1800 showing the analysis result through the productivity management terminal 30 to confirm that the improvement effect had been achieved by using the image forming apparatus 10 according to the manual has been obtained. Therefore, it is possible for the productivity management manager to promote an establishment of the manual and a continuation of using the machine according to the manual.

Note that the screen 1800 of FIG. 18 may display the difference information between the newcomer and the practiced person relating the frequency of error occurrences and the interruption time due to the error occurrence caused by the uses of their machines.

In addition, although the above is an explanation about the improvement action based on making the newcomer manual, the same is true for an improvement action based on a revision of the newcomer manual <Revision Up of Paper Setting Procedure>

Further, the analyzer 903 analyzes the operation log data to acquire the frequency of error occurrences (the numbers of the out-of-paper: for example, 25 times), the number of JAM (for example, 15 times) and an interruption time (for example, 525 minutes) due to the frequency of error occurrences in a period before changing the paper setting according to the manual (one week from the week before last to the last week). Further, the analyzer 903 acquires the frequency of error occurrences (the numbers of the out-of-paper: for example, 5 times), the numbers of JAM (for example, 3 times)) and an interruption time due to error occurrence (for example, 75 minutes) in a period after changing the paper setting according to the manual (one week from the last week to the present week). The analyzer 903 obtains difference information for the numbers of errors and the interruption time due to errors. The analysis result output controller 904 outputs as an analysis result the difference information relating to the paper setting procedure. When the productivity management terminal 30 receives the analysis result from the information processing apparatus 40, the productivity management manager can operate the productivity management terminal 30 to confirm the analysis result.

Figure 19:
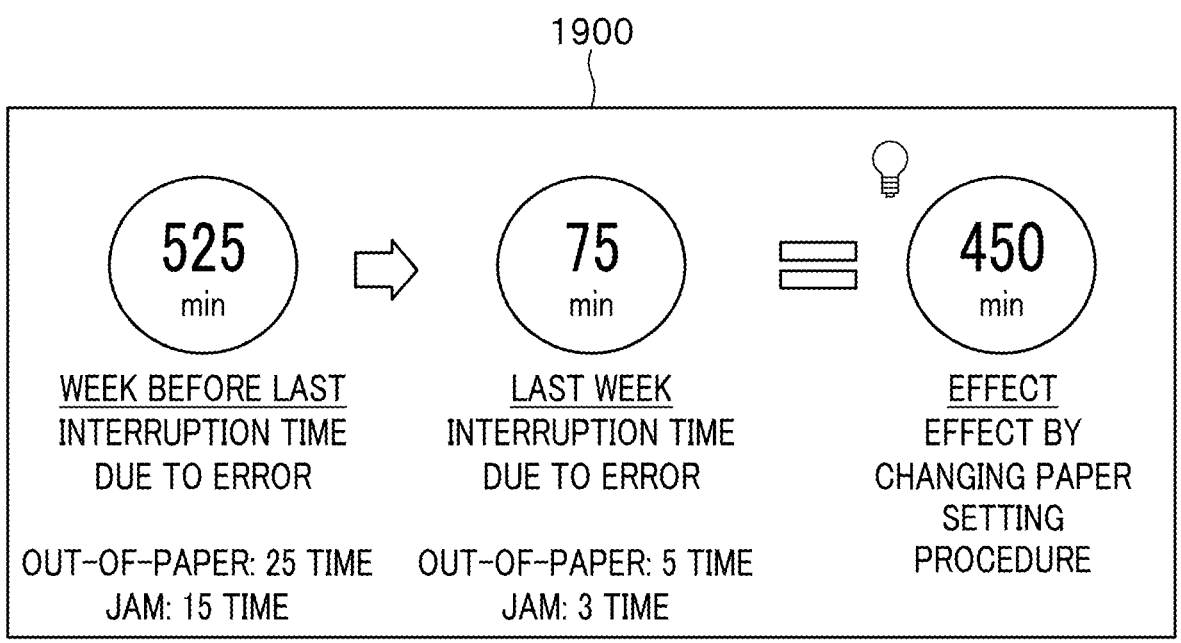
FIG. 19 is a diagram showing a screen example (3) of the specific example (4) of the improvement action.

FIG. 19 is a screen example (3) of the specific example (4) of the improvement action Taking the improvement action has reduced the interruption time due to errors by 450 minutes. The analysis result output controller 904 outputs an analysis result that summarizes the interruption time due to out-of-paper: 525 minutes in the week before last, the interruption time due to out-of-paper: 75 minutes in the last week, and the improvement effect achieved by changing the paper setting procedure according to the manual, that is, 450 minutes corresponding to the difference information. The productivity management manager can view the screen 1900 showing the analysis result through the productivity management terminal 30 to confirm that the improvement effect of 450 minutes has been achieved.

<Revision Up of Image Quality Adjustment Procedure>

The analyzer 903 analyzes the operation log to acquire the frequency of error occurrences (the number of occurrence of color unevenness and streak) and the stop time due to errors in a period before the image quality adjustment is changed according to the manual. Further, the analyzer 903 acquires the frequency of error occurrences (the number of occurrence of color unevenness and streak) and the stop time due to error occurrence in a period after the image quality adjustment is changed according to the manual. The analyzer 903 obtains difference information for the frequency of error occurrence and the stop time due to errors. The analysis result output controller 904 outputs as an analysis result the difference information relating to the image adjustment procedure. When the productivity management terminal 30 receives the analysis result from the information processing apparatus 40, the productivity management manager can operate the productivity management terminal 30 to confirm the analysis result.

The, the analyzer 903 analyzes the operation log to acquire the number of defective sheets and the number of reprints caused by the color unevenness and streak in a period before the image quality adjustment is changed according to the manual. Further, the analyzer 903 obtains the number of defective sheets and the number of reprints caused by the color unevenness and streak in a period after the image quality adjustment is changed according to the manual. The analyzer 903 obtains difference information for the number of defective sheets and the number of reprints. The analysis result output controller 904 outputs the difference information relating to the image adjustment procedure as an analysis result. When the productivity management terminal 30 receives the analysis result from the information processing apparatus 40, the productivity management manager can operate the productivity management terminal 30 to confirm the analysis result.

[Summary]

According to the present embodiment, implementing the improvement measure by changing the setting information allows visualizing the improvement effect of how much the productivity of the image forming apparatus is improved. Therefore, the productivity management manager can confirm the improvement effect and have motivation to perform the improvement measures to continue the improvement measures. This allows the productivity by the image forming apparatus to be improved.

Modification Example (a) The control program according to the present invention can be implemented not only in the information processing apparatus 40 but also in an apparatus such as an image forming apparatus, an image processing apparatus such as a scanner, and various types of servers.

(b) In the present embodiment, the analyzer 903 obtains the first result information, the second result information, and the difference information between the first result information and the second result information. However, the analyzer 903 may obtain only the first result information and the second result information. In this case, the analysis result output controller 904 outputs an analysis result screen 1000 including only the first result information and the second result information. The productivity management manager can obtain two types of information, the first result information and the second result information, from the analysis result screen 1000, and can substantially recognize the difference information. Therefore, the productivity management manager can confirm that the productivity of the image forming apparatus 10 is improved by changing the setting information, which is indicated by the result information. Therefore, the productivity management manager can have motivation to perform the improvement measures and continue the improvement measures to improve the productivity of the image forming apparatus 10.

(c) The information processing apparatus 40 may include a prediction unit that predicts difference information when the setting information is changed to assumptive setting information (the third setting information). The analyzer 903 obtains current result information from the operation log data when current setting information is set in an apparatus such as an image forming apparatus. Further, the prediction unit predicts assumptive result information obtained based on a predetermined algorithm when the current setting information is replaced by the assumptive setting information. The prediction unit can obtain a difference between the assumptive result information and the current result information as the difference information.

(d) When outputting the analysis result screen 1000, the analysis result output controller 904 can give priorities to the improvement measures (options) displayed on the analysis result screen 1000 and display the improvement measures with the priorities. It is preferable that the priority is determined according to a degree of improvement effect obtained by implementing the improvement measures. The productivity management manager can quickly determine which measures are effective with reference to the priorities.

(e) The analysis result output controller 904 can present as the difference information an improvement measure resulting from the last change of the setting information among the improvement measures (options) displayed on the analysis result screen 1000, and an improvement effect resulting from the implementation of the improvement measure. Such a presentation allows the productivity management manager to immediately obtain the setting information as a factor that has last changed the result information of the apparatus.

(f) It may be also possible to achieve a technique by appropriately combining various techniques described in the present embodiment.

(g) The software described in the present embodiment may be implemented as hardware, or the hardware described in the present embodiment may be implemented as software.

(h) Components of the present invention may be appropriately modified without departing from the spirit of the present invention.

Although embodiments of the present invention are described and illustrated in detail as above, the disclosed embodiments are made for purposes of illustration and example only and not limitation of the present invention. The scope of the present invention should be interpreted by terms of the appended claims

What is claimed is:

1. A non-transitory computer readable storage medium storing a control program causing a computer to function as an analyzer analyzing operation log data of an apparatus and as an output controller outputting an analysis result acquired by the analyzer to another device,
wherein the analyzer acquires first result information when first setting information is set, which information is setting information of the apparatus before change, and second result information when second setting information is set, which information is setting information of the apparatus after the change,
wherein the control program causes the computer to function as a designator that designates a first period during which the first result information is acquired and a second period during which the second result information is acquired.

2. The non-transitory computer readable storage medium according to claim 1, wherein the change from the first setting information to the second setting information is a change regarding a settings of automatic switching of a paper feed tray of the apparatus.

3. The non-transitory computer readable storage medium according to claim 1, wherein the change from the first setting information to the second setting information is a change regarding an automatic quality optimization function.

4. The non-transitory computer readable storage medium according to claim 1, wherein the change from the first setting information to the second setting information is a change due to maintenance of the apparatus.

5. The non-transitory computer readable storage medium according to claim 1, wherein the change from the first setting information to the second setting information is a change complying a manual for operating the apparatus.

6. The non-transitory computer readable storage medium according to claim 1, wherein the analyzer acquires difference information between the first result information and the second result information.

7. The non-transitory computer readable storage medium according to claim 1, wherein the control program causes the analyzer to obtain an introduction rate of the apparatus which introduction rate indicates a rate of the apparatuses to which the change from the first setting information to the second setting information is introduced.

8. The non-transitory computer readable storage medium according to claim 7, wherein the control program causes the analyzer to obtain difference information when the introduction rate is changed from a first introduction rate to a second introduction rate.

9. The non-transitory computer readable storage medium according to claim 6, wherein the control program causes the analyzer to predict difference information when the setting information is changed to a third setting information.

10. The non-transitory computer readable storage medium according to claim 6, wherein the control program causes the output controller to output a priority depending on a degree of an effect indicated by the difference information.

11. The non-transitory computer readable storage medium according to claim 1, wherein the control program causes the output controller to output an option indicating a change in the setting information.

12. The non-transitory computer readable storage medium according to claim 11, wherein the control program causes the designator to designate one or more of the options outputted.

13. The non-transitory computer readable storage medium according to claim 6, wherein the control program causes the output controller to output the difference information resulting from a last change of the setting information.

14. The non-transitory computer readable storage medium according to claim 1, wherein the first result information and the second result information include at least one of a frequency of error occurrences in print jobs, an interruption time of the print jobs due to the error, a number of quality defective sheets of printed matter, and a frequency of reprinting.

15. An information processing apparatus comprising:
an analyzer analyzing operation log data of an apparatus and a processor outputting an analysis result acquired by the analyzer to another device, wherein the analyzer obtains first result information when first setting information is set, which information is setting information of the apparatus before change;
second result information when second setting information is set, which information is setting information of the apparatus after the change; and
a designator that designates a first period during which the first result information is acquired and a second period during which the second result information is acquired.

16. An information processing method comprising:
analyzing operation log data of an apparatus and outputting an analysis result acquired by the analyzing, wherein the analyzing obtains first result information when first setting information is set, which information is setting information of the apparatus before change;
second result information when second setting information is set, which information is setting information of the apparatus after the change; and
designating a first period during which the first result information is acquired and a second period during which the second result information is acquired.

* * * * *